(12) United States Patent
Choi et al.

(10) Patent No.: US 11,503,569 B2
(45) Date of Patent: Nov. 15, 2022

(54) APPARATUS AND METHOD FOR EFFICIENTLY TRANSCEIVING PSFCH FOR V2X COMMUNICATION IN WIRELESS COMMUNICATION SYSTEM

(71) Applicant: SAMSUNG ELECTRONICS CO., LTD., Suwon-si (KR)

(72) Inventors: Yongin Choi, Seoul (KR); Yangsoo Kwon, Seoul (KR); Joonsung Kim, Hwaseong-si (KR); Jinwoo Oh, Seogwipo-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 43 days.

(21) Appl. No.: 17/166,111

(22) Filed: Feb. 3, 2021

(65) Prior Publication Data
US 2021/0258919 A1 Aug. 19, 2021

Related U.S. Application Data

(60) Provisional application No. 63/024,098, filed on May 13, 2020, provisional application No. 62/774,430, filed on Feb. 17, 2020.

(30) Foreign Application Priority Data

Aug. 3, 2020 (KR) .................. 10-2020-0096942

(51) Int. Cl.
*H04W 4/40* (2018.01)
*H04B 17/318* (2015.01)
(Continued)

(52) U.S. Cl.
CPC .......... *H04W 72/02* (2013.01); *H04B 17/318* (2015.01); *H04B 17/336* (2015.01);
(Continued)

(58) Field of Classification Search
CPC ....... H04W 4/40; H04W 24/10; H04W 72/02; H04W 72/0446; H04L 1/1819; H04L 5/0055; H04B 17/318; H04B 17/316
See application file for complete search history.

(56) References Cited

U.S. PATENT DOCUMENTS

2010/0058133 A1 3/2010 Lee
2018/0199194 A1 7/2018 Xu et al.
(Continued)

FOREIGN PATENT DOCUMENTS

| EP | 3576321 A1 | 12/2019 |
| KR | 10-2020-0008615 A | 1/2020 |
| WO | 2018/080151 A1 | 5/2018 |

OTHER PUBLICATIONS

Communication dated Jul. 29, 2021 issued by the European Patent Office in application No. 21155972.9.

*Primary Examiner* — Brian P Cox
(74) *Attorney, Agent, or Firm* — Sughrue Mion, PLLC

(57) ABSTRACT

An operating method of a terminal configured to perform vehicle-to-everything (V2X) communication in a wireless communication system, including signaling a maximum physical sidelink feedback channel (PSFCH) receiving capability to a base station; and receiving a wireless signal transmitted from the base station based on the maximum PSFCH receiving capability, wherein the maximum PSFCH receiving capability is a maximum number of PSFCHs receivable during one time transmission interval (TTI).

16 Claims, 13 Drawing Sheets

(51) Int. Cl.

| | | |
|---|---|---|
| | *H04B 17/345* | (2015.01) |
| | *H04L 1/18* | (2006.01) |
| | *H04W 72/02* | (2009.01) |
| | *H04B 17/336* | (2015.01) |
| | *H04L 5/00* | (2006.01) |
| | *H04W 24/10* | (2009.01) |
| | *H04W 72/04* | (2009.01) |

(52) U.S. Cl.
CPC .......... *H04L 1/1819* (2013.01); *H04L 5/0055* (2013.01); *H04W 4/40* (2018.02); *H04W 24/10* (2013.01); *H04W 72/0446* (2013.01)

(56) References Cited

U.S. PATENT DOCUMENTS

| | | |
|---|---|---|
| 2019/0007974 A1 | 1/2019 | Nguyen |
| 2019/0020987 A1 | 1/2019 | Khoryaev et al. |
| 2020/0015272 A1 | 1/2020 | Lee et al. |
| 2020/0067650 A1 | 2/2020 | Kim et al. |
| 2020/0162864 A1 | 5/2020 | Lee et al. |
| 2020/0304969 A1* | 9/2020 | Basu Mallick ......... H04W 4/40 |
| 2022/0150730 A1* | 5/2022 | Freda ...................... H04L 1/188 |

\* cited by examiner

APPARATUS AND METHOD FOR EFFICIENTLY TRANSCEIVING PSFCH FOR V2X COMMUNICATION IN WIRELESS COMMUNICATION SYSTEM

CROSS-REFERENCE TO RELATED APPLICATIONS

This application is based on and claims priority under 35 U.S.C. § 119 to U.S. Provisional Application No. 62/977,430 filed on Feb. 17, 2020, and U.S. Provisional Application No. 63/024,098, filed on May 13, 2020, in the U.S. Patent and Trademark Office, and Korean Patent Application No. 10-2020-0096942, filed on Aug. 3, 2020, in the Korean Intellectual Property Office, the disclosures of which are incorporated by reference herein in their entireties.

BACKGROUND

The disclosure relates to an apparatus and method for efficiently transceiving a physical sidelink feedback channel (PSFCH) to perform vehicle-to-everything (V2X) communication in a wireless communication system.

To meet the increasing demand for wireless data traffic after the commercialization of 4th generation (4G) communication systems, efforts have been made to develop 5th generation (5G) communication systems.

Accordingly, 5G communication systems have been lately commercialized. In order to achieve a high data transmission rate, 5G communication systems may be implemented in an ultrahigh frequency band, for example a millimeter wave (mmWave) band, or for example a 60 gigahertz (GHz) band. To reduce path loss of radio waves and increase a distance by which the radio waves propagate in the ultrahigh frequency band, a beamforming technique, a massive multiple-input and multiple-output (MIMO) technique, a full-dimensional MIMO (FD-MIMO) technique, an array antenna, an analog beam-forming technique, and a large-scale antenna technique have been or will be applied to 5G communication systems.

In addition, to improve networks of communication systems, techniques, such as evolved small cells, advanced small cells, a cloud radio access network (cloud RAN), an ultra-dense network, device-to-device communication (D2D), wireless backhaul, a moving network, cooperative communication, coordinated multi-points (CoMP), and received interference cancellation, have been or will be applied to 5G communication systems.

Furthermore, advanced coding modulation (ACM) techniques, such as hybrid frequency shift keying and quadrature amplitude modulation (FQAM) and sliding window superposition coding (SWSC) and advanced access techniques, such as filter bank multi-carrier (FBMC), non-orthogonal multiple access (NOMA), and sparse code multiple access (SCMA) have been or will be applied to 5G communication systems.

Moreover, unlike long-term evolution (LTE) V2X communication that supports only broadcast, a unicast and a groupcast are also supported in release-16 (Rel-16) new-ratio (NR) V2X communication. Furthermore, a PSFCH has been newly defined to improve the reliability of the unicast and the groupcast. Accordingly, a transmitting terminal, for example a terminal configured to transmit signals and/or channels, may receive an acknowledgement/negative-acknowledgement (ACK/NACK) feedback from a receiving terminal, for example a terminal configured to receive signals and/or channels, through the PSFCH, and thus, hybrid automatic repeat request (HARD) may be enabled.

For reference, a low peak-to-average power ratio (PAPR) sequence, which is based on a Zadoff-Chu sequence, may be applied to the PSFCH, and 1-bit HARQ-ACK/NACK included in the PSFCH may have the above-described sequence format. Also, the PSFCH may be transmitted in units of 1 resource block (RB), and code division multiplexing (CDM) may be applied to the PSFCH so that a plurality of users (or terminals) may transmit the PSFCH through one RB.

However, because the transmitting terminal may simultaneously receive HARQ ACK/NACK from a plurality of receiving terminals in a groupcast mode, as the number of receiving terminals included in a group increases, the number of PSFCHs to be received by the transmitting terminal may increase. However, because a maximum number of PSFCHs that is transceivable by a terminal is not defined in a current 3rd generation partnership project (3GPP) standard, the number of PSFCHs received may exceed a PSFCH receiving capability of the transmitting terminal depending on circumstances. Furthermore, because the transmitting terminal has to determine whether all PSFCHs received from the plurality of receiving terminals are ACK or NACK, an operation of determining whether the PSFCHs are ACK or NACK may increase the work load on the transmitting terminal.

SUMMARY

Provided are an apparatus and method for efficiently transceiving a physical sidelink feedback channel (PSFCH) to perform vehicle-to-everything (V2X) communication in a wireless communication system.

Additional aspects will be set forth in part in the description which follows and, in part, will be apparent from the description, or may be learned by practice of the presented embodiments.

In accordance with an aspect of the disclosure, an operating method of a terminal configured to perform vehicle-to-everything (V2X) communication in a wireless communication system includes signaling a maximum physical sidelink feedback channel (PSFCH) receiving capability to a base station, wherein the maximum PSFCH receiving capability is a maximum number of PSFCHs receivable during one time transmission interval (TTI).

In accordance with an aspect of the disclosure, an operating method of a terminal configured to perform vehicle-to-everything (V2X) communication in a wireless communication system includes signaling a maximum physical sidelink feedback channel (PSFCH) transmission capability to a base station, wherein the maximum PSFCH transmission capability is a maximum number of PSFCHs transmissible during one time transmission interval (TTI).

In accordance with an aspect of the disclosure, a terminal configured to perform vehicle-to-everything (V2X) communication includes a transceiver configured to transmit and receive one or more wireless signals; and a processor configured to control the transceiver to transmit signaling for a maximum physical sidelink feedback channel (PSFCH) receiving capability to a base station, wherein the maximum PSFCH receiving capability is a maximum number of PSFCHs receivable during one time transmission interval (TTI).

In accordance with an aspect of the disclosure, a terminal configured to perform vehicle-to-everything (V2X) communication includes a transceiver configured to transmit and receive one or more wireless signals; and a processor configured to control the transceiver to transmit signaling for a maximum physical sidelink feedback channel (PSFCH) transmission capability to a base station, wherein the maximum PSFCH transmission capability is a maximum number of PSFCHs transmissible during one time transmission interval (TTI).

In accordance with an aspect of the disclosure, a terminal configured to perform vehicle-to-everything (V2X) communication includes a transceiver configured to transmit and receive one or more wireless signals; and a processor configured to: control the transceiver to measure reference signal received powers (RSRPs) or signal-to-interference & noise ratios (SINRs) of k physical sidelink feedback channels (PSFCHs), from among a plurality of PSFCHs received during one time transmission interval (TTI), wherein k is an integer greater than 1, sort the k PSFCHs, based on the RSRPs or the SINRs, in ascending order, control the transceiver to perform a sequential determination of whether the sorted k PSFCHs are a hybrid automatic repeat request (HARQ) acknowledgement (ACK) or a HARQ negative-acknowledgement (NACK) in the ascending order, and determine whether a physical sidelink shared channel (PSSCH) is to be retransmitted, based on the sequential determination.

In accordance with an aspect of the disclosure, a terminal configured to perform vehicle-to-everything (V2X) communication includes a transceiver configured to transmit and receive one or more wireless signals; and a processor configured to control the transceiver, wherein the processor is further configured to control the transceiver to measure reference signal received powers (RSRPs) or signal-to-interference & noise ratios (SINRs) of a plurality of physical sidelink feedback channels (PSFCHs) received during one time transmission interval (TTI), select k PSFCHs that satisfy a preset criterion, from the plurality of PSFCHs, wherein k is an integer greater than 1, sort the selected k PSFCHs based on the RSRPs or the SINRs, in ascending order, control the transceiver to perform a sequential determination of whether the sorted k PSFCHs are a hybrid automatic repeat request (HARQ) acknowledgement (ACK) or a HARQ negative-acknowledgement (NACK) in the ascending order, and determine whether a physical sidelink shared channel (PSSCH) is to be retransmitted, based on the sequential determination.

BRIEF DESCRIPTION OF THE DRAWINGS

The above and other aspects, features, and advantages of certain embodiments of the present disclosure will be more apparent from the following description taken in conjunction with the accompanying drawings in which.

DETAILED DESCRIPTION OF THE EMBODIMENTS

Figure 1:
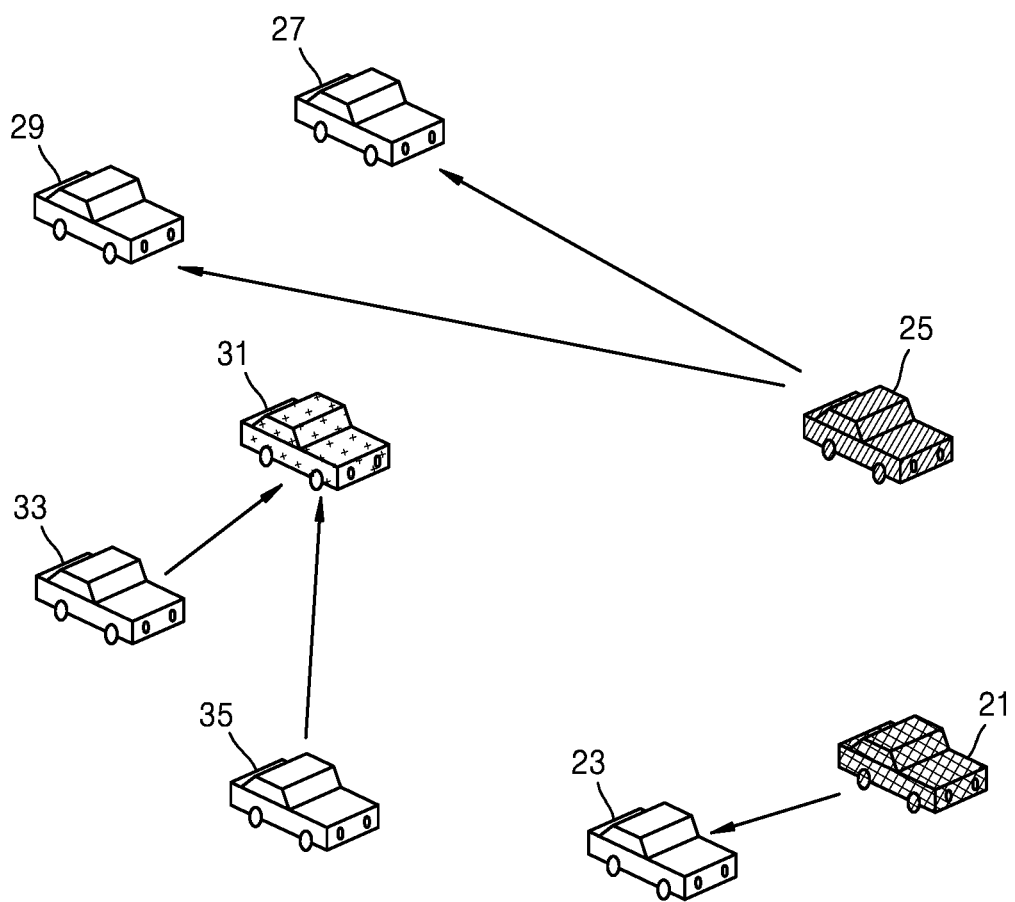
FIG. 1 is a diagram for explaining a unicast, a groupcast, and a physical sidelink feedback channel (PSFCH) transmission process, which are performed between terminals through a sidelink, according to an embodiment.

Hereinafter, embodiments will be described in detail with reference to the accompanying drawings.

Various example embodiments will now be described more fully with reference to the accompanying drawings in which some example embodiments are shown. Embodiments may, however, be embodied in different forms and should not be construed as limited to the embodiments set forth herein. The embodiments may be interchangeable with each other. Rather, these embodiments are provided so that this disclosure is thorough and complete and fully conveys the scope to those skilled in the art. Even when content described in a specific embodiment is not described in other embodiments, the content may be understood as being related to other embodiments unless described otherwise or the content contradicts the specific embodiment in the other embodiments. Like numbers generally refer to like elements throughout the specification.

The terms used herein are to just describe specific embodiments and not intended to limit the scope of other embodiments. The expression of a singular form may include the expression of a plural form unless otherwise indicating clearly in context. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art to which this disclosure belongs. It will be further understood that terms in common usage should also be interpreted as is customary in the relevant art and not in an idealized or overly formal sense unless explicitly so defined herein.

In addition, embodiments will be described in detail by focusing new-radio (NR) systems and long-term evolution (LTE)/LTE-Advanced (LTE-A) systems. However, at the judgement of one skilled in the art, the embodiments may be applied not only to other communication systems having similar technical backgrounds but also to other communication systems using licensed and unlicensed bands with slight modifications within the scope of the disclosure.

Before the following detailed description, the definitions of several words and phrases used throughout the specification will be described. An expression "being connected (combined/accessed) to" and derivatives thereof may refer to any direct or indirect communication between at least two components regardless of whether the at least two components are in physical contact with each other. Terms "transmitting," "receiving," and "communicating" and derivatives thereof may include both direct and indirect communications. Terms "comprising" and "including" and derivatives thereof may refer to inclusion without limitation. A term "or" may be an inclusive word meaning 'and/or.' An expression "being related to" and derivatives thereof may refer to including, being included in, being interconnected with, contain, being contained in, being connected to/with, being combined to/with, communicating with, cooperating with, interposing, putting in parallel, approximating to, being bound by, having, being characterized by, having a relationship with, and the like. A term "controller" refers to a device, a system, or a portion thereof, which controls at least one operation. The controller may be implemented in hardware or a combination of hardware and software and/or firmware. Functions related to any specific controller may be centralized or distributed locally or remotely. When an expression "at least one of" precedes a list of items, any and all combinations of one or more of the listed items may be used or only one of the listed items may be needed. For example, an expression "at least one of A, B, and C" may include any one of A, B, C, both A and B, both A and C, both B and C, and combinations of A, B, and C.

Various functions described below may be implemented or supported by one or more computer programs, each of which may be composed of computer-readable program code and executed on a computer readable medium. As used herein, terms "application" and "program" refer to one or more computer programs, software components, instruction sets, procedures, functions, objects, classes, instances, related data, or portions thereof, which are suitable for the implementation of suitable computer-readable program code. The term "computer-readable program code" includes all types of computer code including source code, object code, and execution code. The term "computer-readable medium" includes all types of media, such as read-only memory (ROM), random access memory (RAM), hard disc drive (HDD), compact disc (CD), digital video disc (DVD), or any other type of memory, which may be accessed by a computer. A "non-transitory" computer-readable medium excludes wired, wireless, optical, or other communication links that transmit transitory electrical or other signals. The non-transitory computer-readable medium includes a medium in which data may be stored permanently and a medium, for example a rewritable optical disc or an erasable memory device, in which data may be stored and overwritten later.

In various embodiments described below, a hardware access method will be explained as an example. However, the various embodiments include a technology using both hardware and software, and thus, the various embodiments do not exclude a software-based access method.

In the following description, a term referring to control information, a term referring to an entry, a term referring to network entities, a term referring to messages, and a term referring to a component of an apparatus will be provided as examples for brevity. Accordingly, embodiments are not limited by terms described below, and other terms having equivalent technical meanings may be used instead.

FIG. 1 is a diagram for explaining a unicast, a groupcast, and a physical sidelink feedback channel (PSFCH) transmission process, which are performed between terminals through a sidelink, according to an example embodiment.

FIG. 1 illustrates a plurality of terminals, for example first terminal 21, second terminal 23, third terminal 25, fourth terminal 27, fifth terminal 29, sixth terminal 31, seventh terminal 33, and eighth terminal 35, configured to perform vehicle-to-everything (V2X) communication according to an embodiment.

To begin with, it can be seen that a communication scheme between the first terminal 21 and second terminal 23 is one-to-one communication, that is, unicast communication performed through a sidelink.

Although FIG. 1 illustrates an example in which a signal is transmitted from the first terminal 21 to the second terminal 23, the signal may be transmitted in an opposite direction. That is, the signal may be transmitted from the second terminal 23 to the first terminal 21.

In addition, an operation of exchanging signals between the first and second terminals 21 and 23 through a unicast may include performing a scrambling process, a control information mapping process, a data transmission process, and a unique identification (ID) value verification process by using resources or values known between the first and second terminals 21 and 23. Also, the first and second terminals 21 and 23 may be mobile terminals, such as vehicles.

Thereafter, it can be seen that a communication scheme between the third to fifth terminals 25, 27, and 29 is groupcast communication in which the third terminal 25 transmits common data to other terminals, for example the fourth and fifth terminals 27 and 29, in a group through a sidelink.

During the groupcast communication, other terminals, for example the second and seventh terminals 23 and 33, that are not included in the group may not receive signals transmitted by the third terminal 25 for a groupcast.

For reference, a terminal configured to transmit signals for the groupcast may not be the third terminal 25 but another terminal, for example the fourth terminal 27 or the fifth terminal 29, in the group. Also, the allocation of resources to transmit signals may be determined by a base station or a terminal serving as a leader in the group or may be selected by the terminal configured to transmit the signals. In addition, the third to fifth terminals 25, 27, and 29 may be mobile terminals, such as vehicles.

Finally, communication among the sixth to eighth terminals 31, 33, and 35 will now be examined. A communication scheme may include communication in which the seventh and eighth terminals 33 and 35 receive common data from the sixth terminal 31 in groupcast communication and transmit feedback on information related to a success or failure of reception of the common data to the sixth terminal 31. Although not shown, feedback on information related to a success or failure of reception of data may also be transmitted between terminals, for example the first and second terminals 21 and 23, which are in unicast communication.

For reference, the information related to the success or failure of reception of the data may be Hybrid Automatic Repeat reQuest (HARQ)-acknowledgement/negative-acknowledgement (ACK/NACK) information, which may be included in a PSFCH. Also, the sixth to eighth terminals 31, 33, and 35 may be mobile terminals, such as vehicles.

As described above, various communication schemes may be applied between the plurality of terminals, for example the first to eighth terminals 21, 23, 25, 27, 29, 31, 33, and 35 configured to perform V2X communication according to an example embodiment. Hereinafter, FIG. 2 will be described based on V2X communication schemes.

Figure 2:
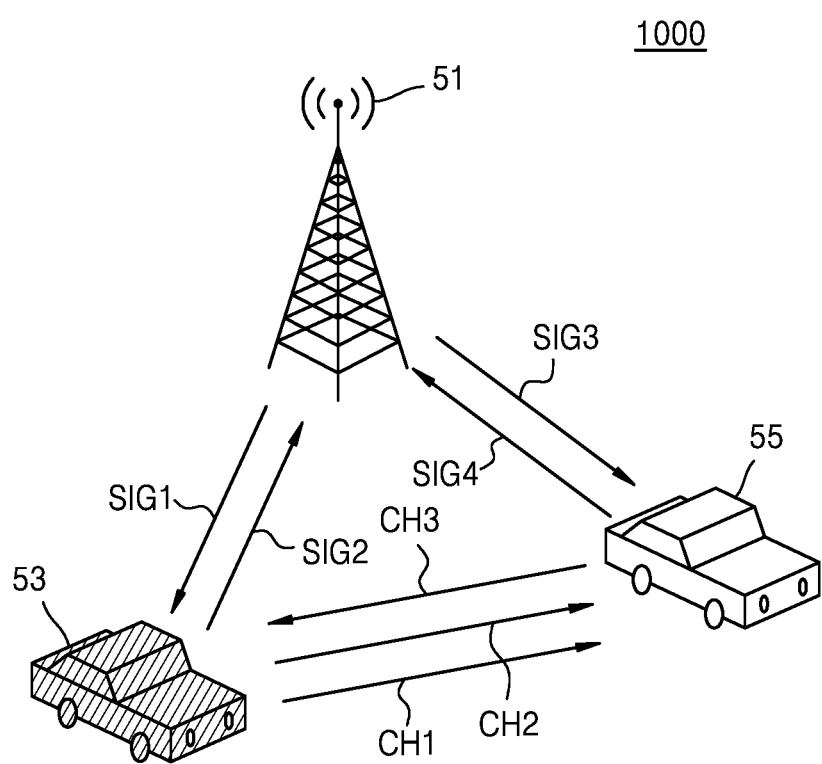
FIG. 2 is a diagram for explaining a process of transmitting signaling between a terminal and a base station and a process of transceiving channels between terminals, according to embodiments.

FIG. 2 is a diagram for explaining a process of signaling between a terminal and a base station and a process of transceiving channels between terminals, according to example embodiments.

Referring to FIG. 2, a wireless communication system 1000 according to an example embodiment may include a base station 51 and a plurality of terminals, for example terminals 53 and 55.

For reference, although FIG. 2 illustrates an example in which the wireless communication system 1000 includes only two terminals 53 and 55 and one base station 51 for brevity, the disclosure is not limited thereto. That is, the wireless communication system 1000 may include more or fewer terminals and base stations.

In addition, each of the terminals 53 and 55 shown in FIG. 2 may be all capable of V2X communication, for example unicast, groupcast, and PSFCH transmission, described with reference to FIG. 1. Thus, although unicast communication between the two terminals 53 and 55 is illustrated in FIG. 2, FIG. 2 may be interpreted as the illustration of groupcast communication between some terminals of a group.

The wireless communication system 1000 may be referred to as radio access technology (RAT). For example, the wireless communication system 1000 may be a wireless communication system using a cellular network, such as an NR communication system, an LTE communication system, an LTE-advanced (LTE-A) communication system, a code division multiple access (CDMA) communication system, and a global system for mobile communications (GSM) communication system. In embodiments, the wireless communication system 1000 may be a wireless local area network (WLAN) communication system, or another arbitrary wireless communication system.

A wireless communication network used in the wireless communication system 1000 may share available network resources and support the communication of a plurality of wireless communication devices including the terminals 53 and 55.

For example, in the wireless communication network, information may be transmitted using various multiple access methods, such as CDMA, frequency division multiple access (FDMA), time division multiple access (TDMA), orthogonal FDMA (OFDMA), single-carrier FDMA (SC-FDMA), OFDM-FDMA, OFDM-TDMA, and OFDM-CDMA.

In embodiments, the wireless communication system 1000 may be an NR communication system. However, example embodiments are not limited thereto and may also be applied to previous-generation and next-generation wireless communication systems.

Moreover, the base station 51 may refer to a fixed station configured to communicate with the terminals 53 and 55 and/or another base station. The base station 51 may communicate with the terminals 53 and 55 and/or another base station and exchange data and control information with the terminals 53 and 55 and/or another base station.

For example, the base station 51 may be referred to as Node B, evolved-Node B (eNB), next-generation Node B (gNB), a sector, a site, a base transceiver system (BTS), an access point (AP), a relay node, a remote radio head (RRH), or a radio unit (RU).

In the present embodiment, the base station 51 may be interpreted as a partial area or function covered by a base station controller (BSC) of CDMA, Node B of wideband CDMA (WCDMA), eNB of LTE, gNB of NR, or a sector (site). The terminals 53 and 55 may be fixed devices as user devices or mobile devices as vehicles and may refer to any devices capable of communicating with the base station 51 and transmitting and receiving data and/or control information to and from the base station 51.

For example, the terminals 53 and 55 may be referred to as wireless stations (STA), mobile stations (MS), mobile terminals (MT), user terminals (UT), user equipment (UE), subscriber stations (SS), wireless devices, handheld devices, or vehicles.

Moreover, the base station 51 may be connected to the terminals 53 and 55 through wireless channels and provide various communication services to the terminals 53 and 55 through the connected wireless channels. Also, all user traffic of the base station 51 may be serviced through a shared channel. In addition, the base station 51 may schedule the terminals 53 and 55 by collecting status information, such as PSFCH capabilities, buffer states, available transmission power states, and channel states of the terminals 53 and 55.

Furthermore, the wireless communication system 1000 may support a beam-forming technique using an orthogonal frequency division multiplexing (OFDM) scheme. In addition, the wireless communication system 1000 may support an adaptive modulation & coding (AMC) scheme, which determines a modulation scheme and a channel coding rate based on channel states of the terminals 53 and 55.

For reference, the wireless communication system 1000 may transmit and receive signals using a wide frequency band including not only a frequency band of less than 6 GHz but also a frequency band of 6 GHz or more.

For example, the wireless communication system 1000 may increase a data transmission rate by using a millimeter wave band, such as a 28 GHz band or a 60 GHz band.

A signal attenuation per distance may be relatively large in the millimeter wave band. Thus, the wireless communication system 1000 may support a transceiving operation based on a directional beam to ensure coverage. Furthermore, the wireless communication system 1000 may perform a beam sweeping operation to enable the transceiving operation based on the directional beam.

Here, the beam sweeping operation may indicate that the terminals 53 and 55 and the base station 51 sequentially or randomly sweep directional beams having a predetermined pattern to determine a transmission beam and a receiving beam of which orientation directions are aligned with each other. That is, patterns of the transmission beam and the receiving beam of which the orientation directions are aligned with each other may be determined as a pair of beam patterns. Also, a beam pattern may refer to a shape of a beam, which is determined based on a width of the beam and an orientation direction of the beam.

Because the terminals 53 and 55 and the base station 51 of the wireless communication system 1000 may be configured and operate as described above, communication between the terminals 53 and 55 or between the terminals 53 and 55 and the base station 51 will now be described in further detail.

The terminals 53 and 55 may transmit or receive signals SIG1, SIG2, SIG4 and SIG4 to and from the base station 51 through an uplink or a downlink and access a network of the wireless communication system 1000. A link between the terminals 53 and 55 and the base station 51, for example a data transceiving interface, may be referred to as a Uu link. Furthermore, to exchange various pieces of setting information required for a signal transceiving operation between the terminals 53 and 55 and the base station 51, radio resource control (RRC) connection may be made between the terminal 53 or 55 and the base station 51. The RRC connection may be referred to as Uu-RRC.

Specifically, for example, the terminals 53 and 55 may transmit the signals SIG2 and SIG4 for a maximum number of PSFCHs, which may be transceived during one time transmission interval (TTI), for example a slot, to the base station 51. In embodiments, the maximum number of PSFCHs which may be transceived during one TTI may be referred to as a maximum PSFCH transceiving capability, or a max PSFCH transceiving capability. Also, information about the max PSFCH transceiving capability may correspond to RRC information, which may be one of user equipment (UE) capability information elements. Accordingly, the terminals 53 and 55 may transmit the signals SIG2 and SIG4 for the max PSFCH transceiving capability to the base station 51 due to RRC signaling. Thus, the information about the max PSFCH transceiving capability may be included in a physical uplink shared channel (PUSCH). The information about the max PSFCH transceiving capability may be included in a physical uplink control channel (PUCCH) or a physical random access channel (PRACH) in addition to the PUSCH, but an example embodiment pertains an example in which the information is included in the PUSCH.

For reference, in the present embodiment, the contents disclosed in Table 1 may be newly introduced and defined in connection with the max PSFCH transceiving capability of a terminal. Thus, the terminals 53 and 55 may signal for the max PSFCH transceiving capability to the base station 51 based on items described in Table 1.

TABLE 1

(1) Introduce an UE capability signaling that UE can receive [F] PSFCH(s) in a slot.
(2) Introduce an UE capability signaling that UE can transmit [R] PSFCH(s) in a slot.
(3) F and R are for both a groupcast and a unicast.

For example, 'UE capability signaling' of item (1) of Table 1 may be expressed as shown in Table 2 below.

TABLE 2

NR_V2X_Max_PSFCHdecoding ::= ENUMERATED {n10, n20, n30, n40, n50, n100, n200, n300, nmax, spare}

For example, 'UE capability signaling' of item (2) of Table 1 may be expressed as shown in Table 3 below.

TABLE 3

NR_V2X_Max_PSFCHtransmit ::= ENUMERATED {n1, n2, n3, n4, n5, n10, n20, n30, nmax, spare}

Furthermore, the contents disclosed in Table 1 may be arranged as in Table 4-1 and Table 4-2 below.

TABLE 4-1

| Index | Feature group | Components | Prerequisite feature groups | Need for the gNB to know if the feature is supported | Applicable to the capability signalling exchange between UEs (V2X work item (WI) only). | Consequence if the feature is not supported by the UE |
|---|---|---|---|---|---|---|
| 15-11 | PSFCH format 0 | 1) UE can transmit and receive NR PSFCH format 0  2) UE can receive [N] PSFCH(s) resources in a slot.  3) UE can transmit [M] PSFCH(s) resources in a slot. | At least one of 15-1, 15-2, 15-3 | FFS | FFS | |

TABLE 4-1-continued

| Feature Index group | Components | Prerequisite feature groups | Need for the gNB to know if the feature is supported | Applicable to the capability signalling exchange between UEs (V2X work item (WI) only). | Consequence if the feature is not supported by the UE |
|---|---|---|---|---|---|
| | [4) UE can report sidelink HARQ-ACK to gNB via PUCCH and PUSCH when it is operating in NR sidelink mode 1.] [FFS: move to 15-2] | | | | |

TABLE 4-2

| Type (the 'type' definition from UE features should be based on the granularity of 1) Per UE or 2) Per Band or 3) Per BC or 4) Per FS or 5) Per FSPC) | Need of frequency division duplexing (FDD)/time division duplexing (TDD) differentiation | Need of frequency range 1 (FR1)/frequency range 2 (FR2) differentiation | Capability interpretation for mixture of FDD/TDD and/or FR1/FR2 | Note | Mandatory/Optional |
|---|---|---|---|---|---|
| Per band | N.A. | N.A. | N.A. | This is the basic FG for sidelink. Note: configuration by NR Uu is not required to be supported in a band indicated with only the PC5 interface in 38.101-1 Table 5.2E-1 Note: Component 4 is not required to be supported in a band indicated with the PC5 interface in 38.101-1 Table 5.2E-1 | Optional with capability signalling FFS: For UE supports NR sidelink, UE must indicate this FG is supported. ALT 1) Candidate values for N are {5, [10,] 15, [20,] 25, [30,] 35, [40,] 45, 50} ALT 2) Candidate values for N are {32, 64} Candidate values for M are {1, 4, [5,] 8, 16} |

For reference, Table 4-1 and Table 4-2 are tables into which one continuous table is divided on account of limited space.

As described above, in an example embodiment, the terminal 53 or 55 may signal for the max PSFCH transceiving capability to the base station 51, an example of which will be described in further detail with reference to FIG. 8. Moreover, the base station 51 may perform RRC signaling, for example signals SIG1 and SIG3, to the terminals 53 and 55 based on the signaling from the terminals 53 and 55 and perform a scheduling operation for transmitting and receiving signals, for example PSSCH, PSCCH, and PSFCH, between the terminals 53 and 55 or perform groupcast-related setting operations of, for example, selecting a leader in a group and setting a size of a zone for a groupcast.

For reference, the terminals 53 and 55 may receive scheduling information for sidelink communication, based on the RRC signaling, for example signals SIG1 and SIG3, from the base station 51 or information, for example downlink control information (DCI), of a physical downlink control channel (PDCCH).

In addition, the terminals 53 and 55 may transmit and receive signals, for example channel CH1, channel CH2, and channel CH3, to and from each other through a sidelink. The sidelink, for example a data transceiving interface, between the terminals 53 and 55 may be referred to as a PC5 link. Furthermore, to exchange various pieces of setting information required to transceive the signals between the terminals 53 and 55, RRC connection may be made between the terminals 53 and 55. The RRC connection may be referred to as PC5-RRC.

Herein, the channels transceived through the sidelink may include, for example, a sidelink control channel, for example a physical sidelink control channel (PSCCH), a sidelink shared channel or data channel, for example a physical sidelink shared channel (PSSCH), a sidelink broadcast channel, for example a physical sidelink broadcast channel (PSBCH) broadcasted with a synchronization signal, and a feedback transmission channel, for example a physical sidelink feedback channel (PSFCH).

In embodiments, the terminal 53 configured to perform a data transmission operation in the sidelink may be referred to as a transmitting terminal, and the terminal 55 configured to perform a data receiving operation in the sidelink may be referred to as a receiving terminal. Both the transmitting terminal and the receiving terminal may respectively perform the data transmission operation and the data receiving operation in the sidelink.

The transmitting terminal 53 may generate sidelink scheduling information, for example sidelink control information (SCI), based on scheduling information provided by the base station 51. Also, the transmitting terminal 53 may transmit a PSCCH CH1 including the generated sidelink scheduling information to the receiving terminal 55.

Here, the sidelink scheduling information may be transmitted as single SCI to the receiving terminal 55 or may be divided into two pieces of SCI and transmitted to the receiving terminal 55. For reference, a method in which the sidelink scheduling information is divided into two pieces of SCI and transmitted to the receiving terminal 55 may be referred to as 2-stage SCI, or a 2-stage PSCCH.

The transmitting terminal 53 may transmit a PSSCH CH2, which is a data channel, to the receiving terminal 55, based on the sidelink scheduling information. Also, the receiving terminal 55 may transmit feedback on a PSFCH CH3, which includes information, for example HARQ-ACK/NACK, related to a success or failure of the reception of the PSSCH CH2 transmitted by the transmitting terminal 53, to the transmitting terminal 53. Thus, the transmitting terminal 53 may determine whether the PSFCH CH3 received from the receiving terminal 55 includes HARQ ACK or NACK and determine whether the PSSCH CH2 is to be retransmitted, based on the determination result.

As described above, various signals or channels may be transmitted and received between the terminals 53 and 55 and the base station 51 as will be described below in further detail.

The wireless communication system 1000 according to an example embodiment has characteristics and configurations as described above. Thus, a structure of a time-frequency range applied to a sidelink of an NR communication system according to an example embodiment will now be described with reference to FIGS. 3 to 5.

Figure 3:
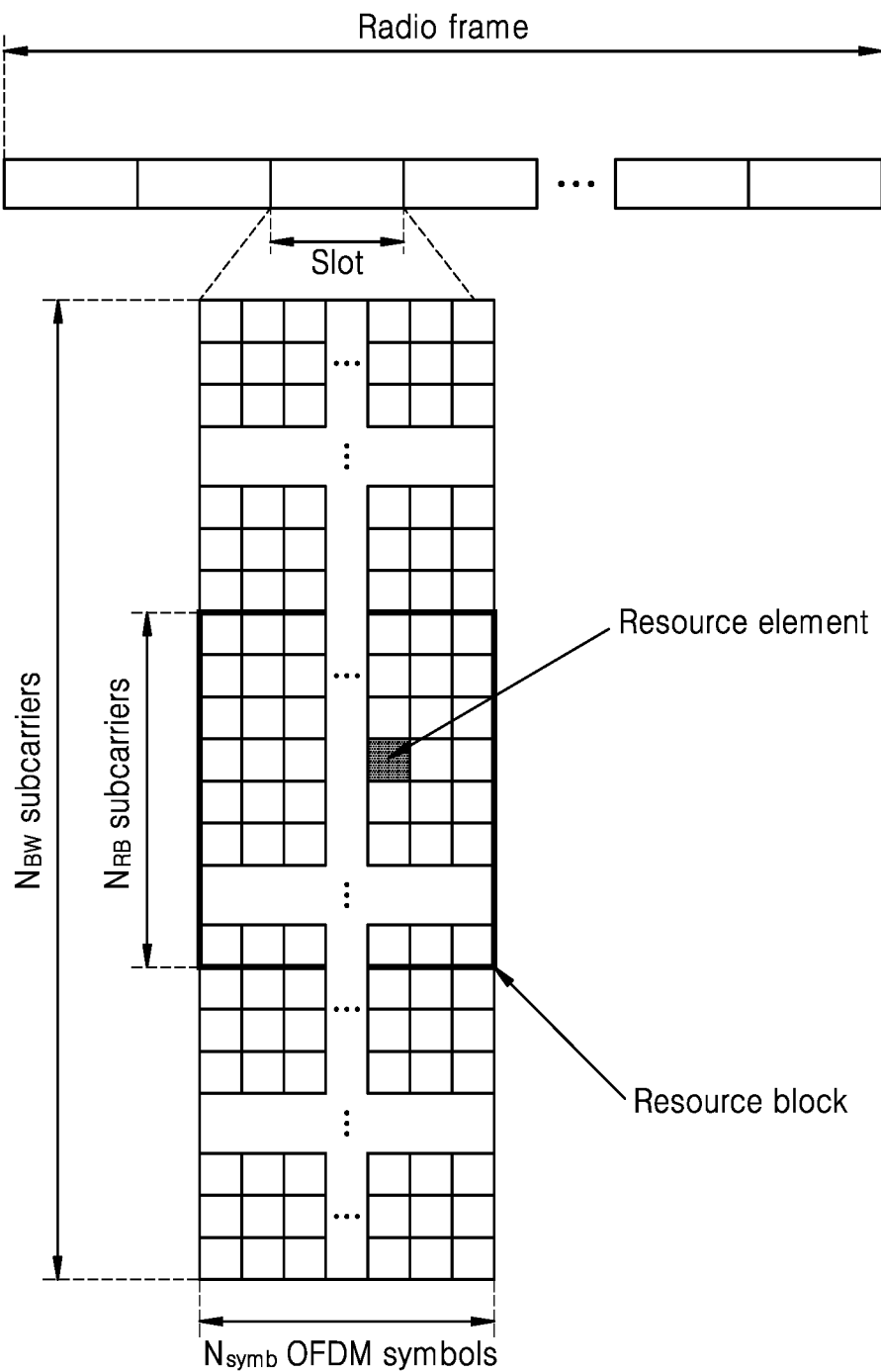
FIGS. 3 to 5 are diagrams for explaining a structure of a time-frequency range applied to sidelink of a new-ratio (NR) communication system according to embodiments.
Figure 4:
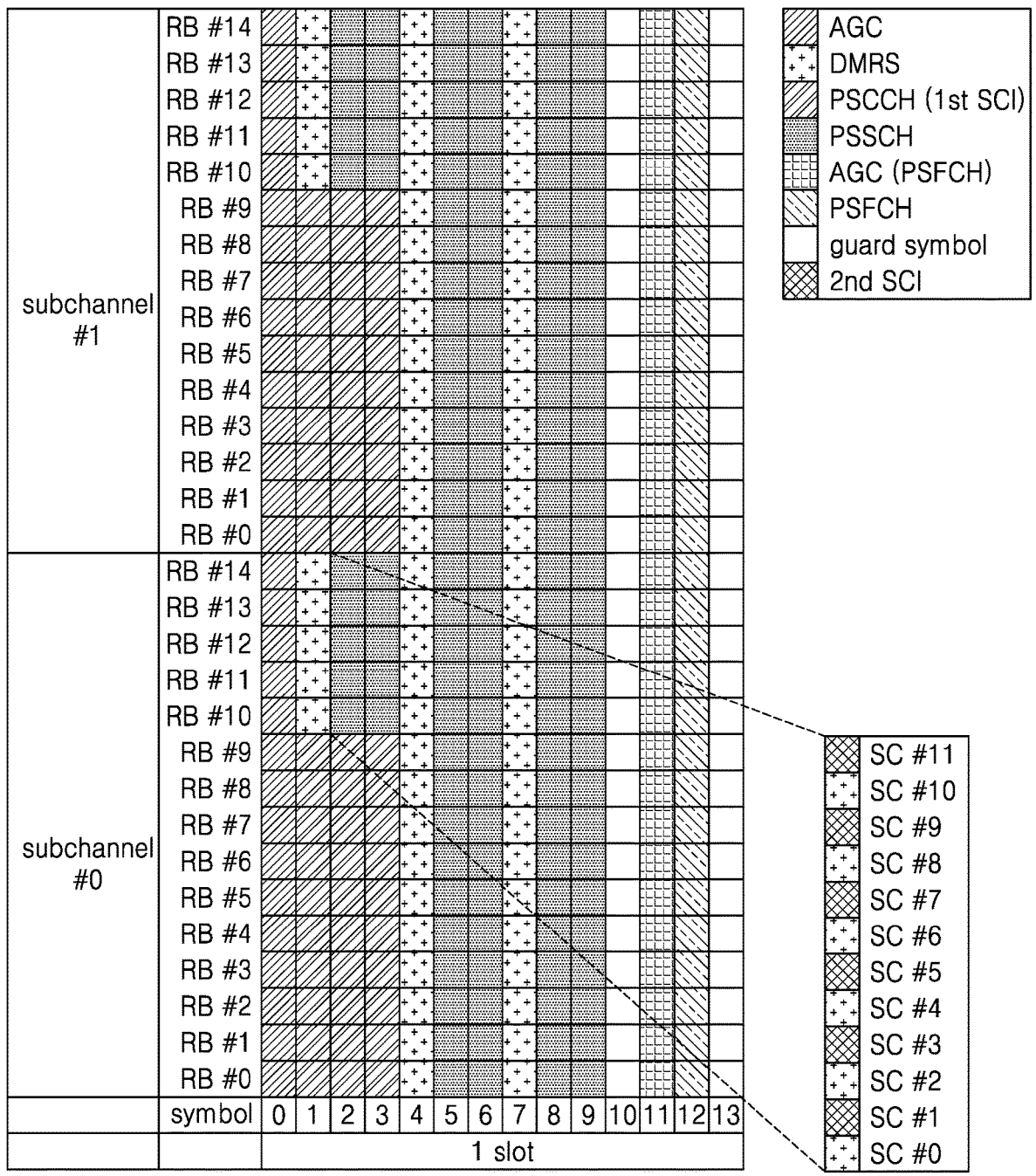
Figure 5:
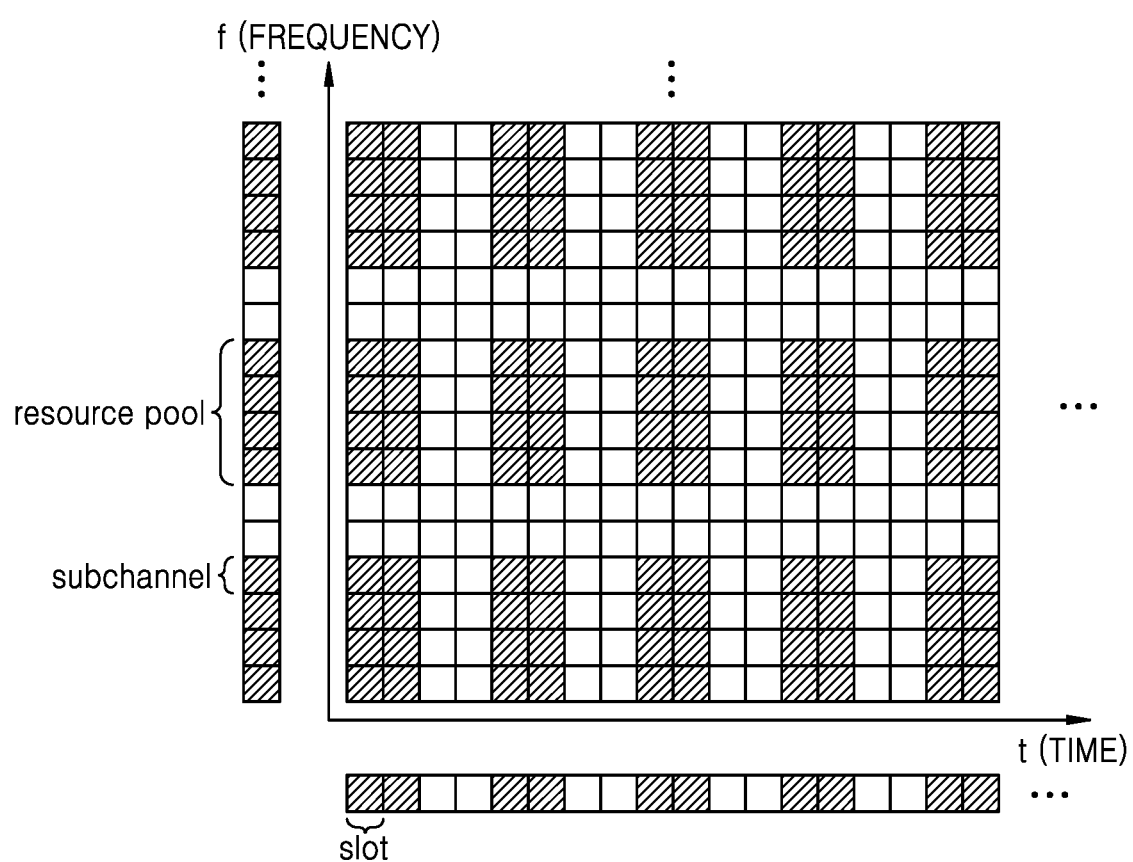

For reference, the structure of the time-frequency range shown in FIGS. 3 to 5 may be an example of a time-frequency range applicable to the present embodiment, and thus, the disclosure is not limited thereto. However, for brevity, the structure of the time-frequency range shown in FIGS. 3 to 5 will be described as an example.

To begin with, referring to FIG. 3, the abscissa denotes a time area, and the ordinate denotes a frequency range. A minimum transmission unit in the time domain may be an OFDM symbol, and $N_{symb}$ OFDM symbols may form one slot. A length of a subframe may be 1.0 ms, and a length of radio frame may be 10 ms. A minimum transmission unit in the frequency range may be a subcarrier, and a system transmission bandwidth may include a total of $N_{BW}$ subcarriers.

In the time-frequency range, a basic unit of a resource may be a resource element (RE), which may be expressed by an OFDM symbol index and a subcarrier index. A resource block (RB) or a physical resource block (PRB) may be defined by $N_{symb}$ consecutive OFDM symbols in the time domain and $N_{RB}$ consecutive subcarriers in the frequency domain. Accordingly, one RB may include $N_{symb} \times N_{RB}$ REs.

For reference, a minimum transmission unit of data may be typically an RB unit. In the NR communication system, typically, $N_{symb}$ may be at least one, $N_{RB}$ may be equal to 12, and $N_{BW}$ and $N_{RB}$ may be proportional to the system transmission bandwidth. Also, a data rate may increase in proportion to the number of RBs, which is scheduled for a terminal.

In addition, a channel bandwidth may indicate an RF bandwidth corresponding to the system transmission bandwidth. For example, in an NR communication system having a channel bandwidth of 100 MHz at a subcarrier width of 30 kHz, a transmission bandwidth may include 273 RBs.

Referring to FIGS. 4 and 5 based on the above description, a subchannel and a resource pool defined to improve resource use efficiency in release-16 (Rel-16) NR V2X communication are illustrated. For reference, a basic frame structure, for example a structure of a time-frequency domain, of NR V2X communication and a 2-stage PSCCH are illustrated in FIG. 4. Also, a resource pool is illustrated in FIG. 5.

Specifically, in the NR V2X communication, one slot may include at least one resource pool, each of which may include a plurality of subchannels. Here, a size of the subchannel may be, for example, any one of 10, 15, 20, 25, 50, 75, and 100 RBs. However, the size of the subchannel may be any one of 4, 5, and 6 RBs according to circumstances. As an example, FIG. 4 illustrates an example which includes subchannel #1 and subchannel #2, and each of subchannel #1 and subchannel #2 includes 15 RBs, illustrated as RB #0 of subchannel #1 through RB #14 of subchannel #1, and RB #0 of subchannel #2 through RB #14 of subchannel #2.

In addition, a 0-th symbol (symbol 0) of the slot may be a symbol for automatic gain control (AGC) training.

Furthermore, a PSFCH for determining whether a PSSCH is normally received may be allocated and transmitted in a twelfth symbol (symbol 12) of the slot. Transmission timing may be in two or three slots after a slot in which the PSSCH is transmitted. For example, when a PSSCH is transmitted in a slot A, a PSFCH corresponding to the PSSCH may be transmitted feedback in a slot A+2 or a slot A+3.

For reference, a PSFCH may include 1 PRB (or 1 RB) and be transmitted for each subchannel. Also, a transceiving period of each PSFCH may be set, and a minimum value of the transceiving period may be defined as 1, for example 1 slot unit. Since a plurality of PSFCHs may use the same resource, up to six cyclic shifts may be applied to different PSFCHs transmitted to the same RB. Accordingly, up to $$\left( \frac{273 \ PRB}{4 \ PRB/\text{subchannel}} * 6 \text{ cyclic shift pairs/subchannel} \right) \approx 410 \ PSFCHs$$

may be transmitted during each slot.

AGC for receiving a PSFCH may be allocated in a symbol (for example, symbol 11) immediately preceding the PSFCH. Because a transmission subject, for example a transmitting terminal, of the 0-th to ninth symbols (symbols 0 to 9) is different from a transmitting terminal, for example a receiving terminal, of the eleventh and twelfth symbols (symbols 11 and 12), the AGC for the PSFCH may be separately needed.

In addition, a guard symbol may be allocated to the tenth and thirteenth symbols (symbols 10 and 13) to ensure a guard time for timing advance. Because the transmission subject of the 0-th to ninth symbols (symbols 0 to 9) is different from the transmitting terminal of the eleventh and twelfth symbols (symbols 11 and 12), symbol timings may be misaligned by a receiver, and thus, the guard symbol may be needed.

Demodulation reference signals (DMRSs), PSCCHs, and PSSCHs may be allocated to the first to ninth symbols (symbols 1 to 9) other than the channels and symbols described above. Furthermore, PSFCHs, AGC, and guard symbols may be allocated to the first to ninth symbols (symbols 1 to 9). However, for brevity, an example embodiment pertains to an example in which PSFCHs, AGC, and guard symbols are allocated to the tenth to thirteenth symbols.

For reference, in the NR V2X communication, because the PSCCH is transmitted by two stages, a 1st PSCCH may be originally allocated to a PSCCH scheduling range, and a 2nd PSCCH may be allocated to a PSSCH range.

More specifically, the 1st PSCCH may be present from a lowest RB (e.g., RB #0 of subchannel #0) of a subchannel and include 1st SCI. Also, the 1st SCI may include allocation information, for example frequency domain resource allocation (FDRA) and time domain resource allocation (TDRA), of the PSSCH and allocation information of the 2nd PSCCH. The 2nd PSCCH may include 2nd SCI and be first allocated to a lowest RE, for example SC #1, where SC refers to a subcarrier, excluding an RE for a DMRS in a first DMRS symbol, for example a DMRS of symbol 0. In addition, the 2nd SCI may include information required to decode the PSSCH.

As described above, a time-frequency range applied to the sidelink of the NR communication system may be configured according to the present embodiment. Hereinafter, a configuration of a radio-frequency (RF) transceiver of a terminal or a base station, according to an example embodiment, will be described with reference to FIGS. 6 and 7.

Figure 6:
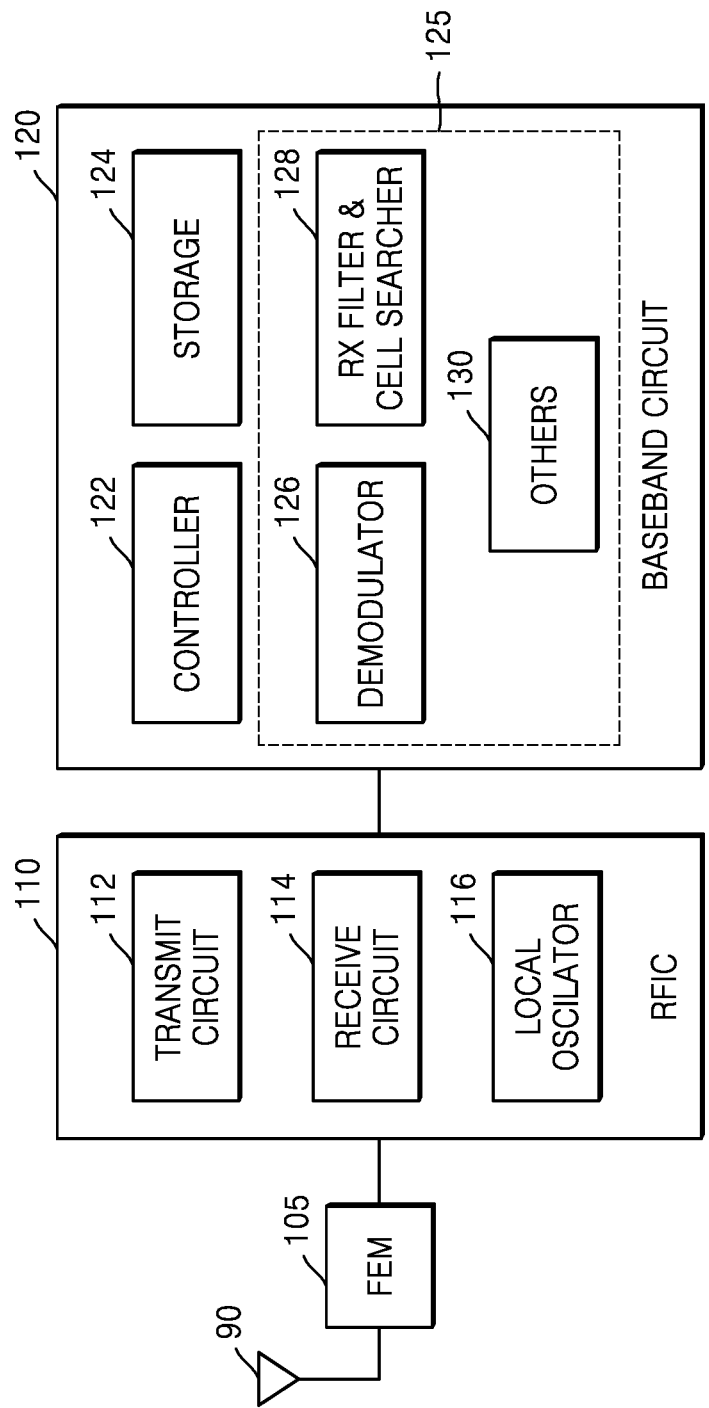
FIG. 6 is a block diagram of radio-frequency (RF) transceiver components included in a terminal or a base station, according to an embodiment.
Figure 7:
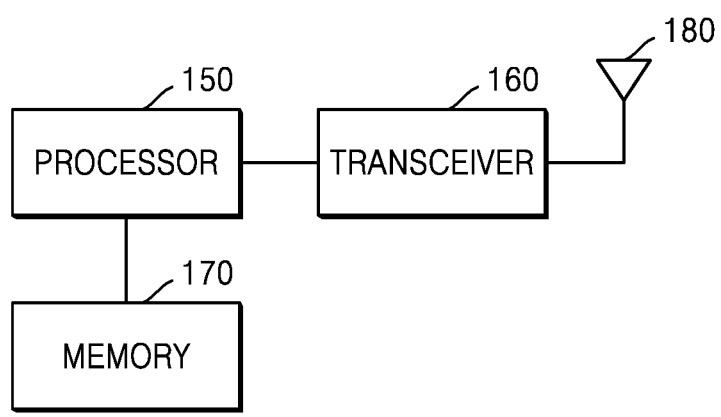
FIG. 7 is a simplified block diagram of RF transceiver components of FIG. 6, according to an embodiment.

FIG. 6 is a block diagram of RF transceiver components included in a terminal or a base station, according to an example embodiment. FIG. 7 is a simplified block diagram of RF transceiver components of FIG. 6, according to an embodiment.

For reference, the RF transceiver components of FIGS. 6 and 7 may be included in the terminal 53 or 55 of FIG. 2 or the base station 51. Also, the RF transceiver components of FIGS. 6 and 7 may include both components in a transmitting path and components in a receiving path.

Hereinafter, for brevity, an example in which the RF transceiver components illustrated in FIGS. 6 and 7 are included in the terminal 53 of FIG. 2 will be described. Also, a baseband circuit 120 of FIG. 6 will be described centering on the components in the receiving path.

To begin with, referring to FIG. 6, the terminal such as terminal 53 may include an antenna 90, a front-end module (FEM) 105, an RF integrated circuit (RFIC) 110, and the baseband circuit 120.

The antenna 90 may be connected to the FEM 105 and transmit a signal provided by the FEM 105 to another wireless communication device, for example a terminal or a base station, or provide a signal received from another wireless communication device to the FEM 105. Also, the FEM 105 may be connected to the antenna 90 and separate a transmission frequency from a receiving frequency. That is, the FEM 105 may separate a signal provided by the RFIC 110 for each frequency band and provide the separated signal to the antenna 90 corresponding thereto. In addition, the FEM 105 may provide a signal provided by the antenna 90 to the RFIC 110.

As described above, the antenna 90 may transmit the signal, of which the frequency is separated, to the outside, for example the outside of the terminal such as terminal 53, or provide an externally received signal to the FEM 105.

For reference, the antenna 90 may include, for example, an array antenna, without being limited thereto. Also, the antenna 90 may be provided in singular or plural. Thus, in some embodiments, terminal 53 may support a phased array and multi-input and multiple-output (MIMO) using a plurality of antennas. However, one antenna 90 is illustrated in FIG. 6 for brevity.

The FEM 105 may include an antenna tuner. The antenna tuner may be connected to the antenna 90 and adjust an impedance of the antenna 90.

The RFIC 110 may perform an up-conversion on a baseband signal received from the baseband circuit 120 and generate an RF signal. Also, the RFIC 110 may perform a down-conversion on an RF signal received from the FEM 105 and generate a baseband signal.

Specifically, the RFIC 110 may include a transmit circuit 112 for an up-conversion operation, a receive circuit 114 for a down-conversion operation, and a local oscillator 116.

For reference, the transmit circuit 112 may include a first analog baseband filter, a first mixer, and a power amplifier. Also, the receive circuit 114 may include a second analog baseband filter, a second mixer, and a low-noise amplifier.

Here, the first analog baseband filter may filter the baseband signal received from the baseband circuit 120 and provide the filtered baseband signal to the first mixer. Also, the first mixer may perform an up-conversion of converting a frequency of the baseband signal from a baseband to a high-frequency band according to a frequency of a signal provided by the local oscillator 116. Due to the up-conversion, the baseband signal may be provided as an RF signal to the power amplifier, and the power amplifier may amply power of the RF signal and provide the RF signal, of which power is amplified, to the FEM 105.

The low-noise amplifier may amplify the RF signal provided by the FEM 105 and provide the amplified RF signal to the second mixer. The second mixer may perform a down-conversion of converting a frequency of the RF signal from a high-frequency band to a baseband according to the frequency of the signal provided by the local oscillator 116. Due to the down-conversion, the RF signal may be provided as a baseband signal to the second analog baseband filter, and the second analog baseband filter may filter the baseband signal and provide the filtered baseband signal to the baseband circuit 120.

Moreover, the baseband circuit 120 may receive a baseband signal from the RFIC 110 and process the baseband signal or generate the baseband signal and provide the baseband signal to the RFIC 110.

In addition, the baseband circuit 120 may include a controller 122, a storage 124, and a signal processing unit 125.

Specifically, the controller 122 may control not only the overall operations of the baseband circuit 120 but also the overall operations of the RFIC 110. Also, the controller 122 may write data to the storage 124 or read data from the storage 124. To this end, the controller 122 may include at least one processor, at least one microprocessor, or at least one microcontroller or be a portion of a processor. More specifically, the controller 122 may include, for example, a central processing unit (CPU) and a digital signal processor (DSP).

The storage 124 may store basic programs, application programs, and data, for example setting information, for operations of the terminal 53. For example, the storage 124 may store instructions and/or data associated with the controller 122, the signal processing unit 125, or the RFIC 110.

Furthermore, the storage 124 may include various storage media. That is, the storage 124 may include a volatile memory, a non-volatile memory, or a combination of a volatile memory and a non-volatile memory. For example, the storage 124 may include random access memory (RAM), for example dynamic RAM (DRAM), phase-change RAM (PRAM), magnetic RAM (MRAM), and static RAM (SRAM), and flash memory, such as NAND flash memory, NOR flash memory, and OneNAND flash memory.

In addition, the storage 124 may store various processor-executable instructions. The processor-executable instructions may be executed by the controller 122.

The signal processing unit 125 may process the baseband signal received from the RFIC 110.

Specifically, the signal processing unit 125 may include a demodulator 126, a RxFilter & cell searcher 128, and other components 130.

To begin with, the demodulator 126 may include a channel estimator, a data deallocation unit, an interference whitener, a symbol detector, a channel state information (CSI) generator, a mobility measurement unit, an automatic gain control unit, an automatic frequency control unit, a symbol timing recovery unit, a delay spread estimation unit, and a time correlator and perform functions of each of components described above.

Herein, the mobility measurement unit may be a unit configured to measure signal quality of serving cells and/or neighbor cells to support mobility. The mobility measurement unit may measure a received signal strength indicator (RSSI), a reference signal received power (RSRP), a reference signal received quality (RSRQ), a reference signal (RS)-signal-to-interference-plus(&)-noise ratio (SINR) of cells.

For reference, although not shown, the demodulator 126 may include a plurality of sub-demodulators configured to independently or jointly perform the above-described operations on signals, which are respectively de-spread in a 2nd generation (2G) communication system, a 3rd generation (3G) communication system, a 4th generation (4G) communication system, and a 5th generation (5G) communication system, or signals of respective frequency bands.

Thereafter, the RxFilter & cell searcher 128 may include a RxFilter, a cell searcher, a fast Fourier transform (FFT) unit, a time duplex-automatic gain control (TD-AGC) unit, and a time duplex-automatic frequency control (TD-AFC) unit.

Herein, the RxFilter, which may also be referred to as an receiver (Rx) front end, may perform sampling, interference cancellation, and amplification on the baseband signal received from the RFIC 110. Also, the cell detector may include a primary synchronization signal (PSS) detector and a secondary synchronization signal (SSS) detector and measure magnitudes and quality of signals from adjacent cells.

Moreover, the other components 130 may include a symbol processor, a channel decoder, and an uplink processor.

Herein, the symbol processor may perform channel-deinterleaving, demultiplexing, and rate-matching to decode demodulated signals for each channel. Also, the channel decoder may decode the demodulated signals in units of code blocks.

For reference, the symbol processor and the channel decoder may include a hybrid automatic repeat request (HARD) processing unit, a turbo decoder, a cyclic redundancy check (CRC) checker, a Viterbi decoder, and a turbo encoder.

The uplink processor, which is a processor configured to generate a transmission baseband signal, may include a signal generator, a signal allocator, an inverse fast Fourier transform (IFFT) unit, a discrete Fourier transform (DFT) unit, and a transmitter (Tx) front end.

Herein, the signal generator may generate a PUSCH, a PUCCH, and a PRACH. Also, the Tx Front End may perform operations, such as an interference cancellation and a digital mixing, on the transmission baseband signal.

For reference, the other components 130 may further include a sidelink processor. The sidelink processor may generate a physical sidelink shared channel (PSSCH), a physical sidelink control channel (PSCCH), and a physical sidelink feedback channel (PSFCH). In another case, the sidelink processor may not be separately provided but integrated with the uplink processor into one processor. However, for brevity, an example embodiment pertains an example in which the sidelink processor is provided separately from the uplink processor.

The signal processing unit 125 may have configurations and characteristics described above. However, respective configurations or functions of the demodulator 126, the RxFilter & cell searcher 128, and the other components 130 in the signal processing unit 125 may be changed. For example, the channel estimator in the demodulator 126 may be included in the RxFilter & cell searcher 128 or the other components 130, and the FFT unit in the RxFilter & cell searcher 128 may be included in the demodulator 126 or the other components 130. Also, the channel decoder in the other components 130 may be included in the demodulator 126 or the RxFilter & cell searcher 128. However, for brevity, an example embodiment pertains an example in which respective configurations or functions of the demodulator 126, the RxFilter & cell searcher 128, and the other components 130 in the signal processing unit 125 are implemented as described above.

As described above, FIG. 6 illustrates a case in which the baseband circuit 120 includes the controller 122, the storage 124, and the signal processing unit 125.

However, at least two of the controller 122, the storage 124, and the signal processing unit 125 may be integrated into one component in the baseband circuit 120. Also, the baseband circuit 120 may further include additional components other than the above-described components or may not include some components. Furthermore, the signal processing unit 125 may further include additional components other than the above-described components or may not include some components.

However, for brevity, an example embodiment pertains an example in which the baseband circuit 120 includes the components described above.

Furthermore, in some embodiments, the controller 122, the storage 124, and the signal processing unit 125 may be included in one device. In other embodiments, the controller 122, the storage 124, and the signal processing unit 125 may be distributed and included in respectively different devices, for example in a distributed architecture.

The RF transceiver components of FIG. 6, which has the above-described configuration may be included in, for example, one or more of the terminal 53 or 55 or the base station 51 of FIG. 2.

The RFIC 110 and the baseband circuit 120 may include components, which are well known to one of ordinary skill as shown in FIG. 6. Also, the components may be executed in a known manner by using hardware, firmware, a software logic or a combination thereof.

However, FIG. 6 illustrates only an example of the RF transceiver components, and embodiments are not limited thereto. That is, various changes, for example addition or deletion of components, may be made in FIG. 6.

FIG. 7 illustrates an example in which a configuration of the RF transceiver components of FIG. 6 is partially changed, for example simplified.

Specifically, the terminal 53 may include a processor 150, a transceiver 160, a memory 170, and an antenna 180.

The processor 150 may control the overall operations of the transceiver 160 and write or read data to or from the memory 170. That is, the processor 150 may be, for example, a component including functions of the controller 122 of FIG. 6.

The transceiver 160 may transmit and receive wireless signals and be controlled by the processor 150. That is, the transceiver 160 may be, for example, a component including functions of the FEM 105, the RFIC 110, and the signal processing unit 125 of FIG. 6.

The memory 170 may include basic programs, application programs, and data, for example setting information, for operations of the terminal 53. Thus, the memory 170 may store instructions and/or data associated with the processor 150 and the transceiver 160. That is, the memory 170 may be, for example, a component including functions of the storage 124 of FIG. 6.

The antenna 180 may be connected to the transceiver 160 and transmit a signal provided by the transceiver 160 to another wireless communication device, for example a terminal or a base station, or provide a signal received from another wireless communication device to the transceiver 160. That is, the antenna 180 may be, for example, a component including functions of the antenna 90 of FIG. 6.

Because the terminal 53 or 55 or the base station 51 has characteristics and configurations described above in an example embodiment, an example of a process of signaling between the terminal 53 or 55 and the base station 51 to enable V2X communication will now be described in detail with reference to FIG. 8.

Figure 8:
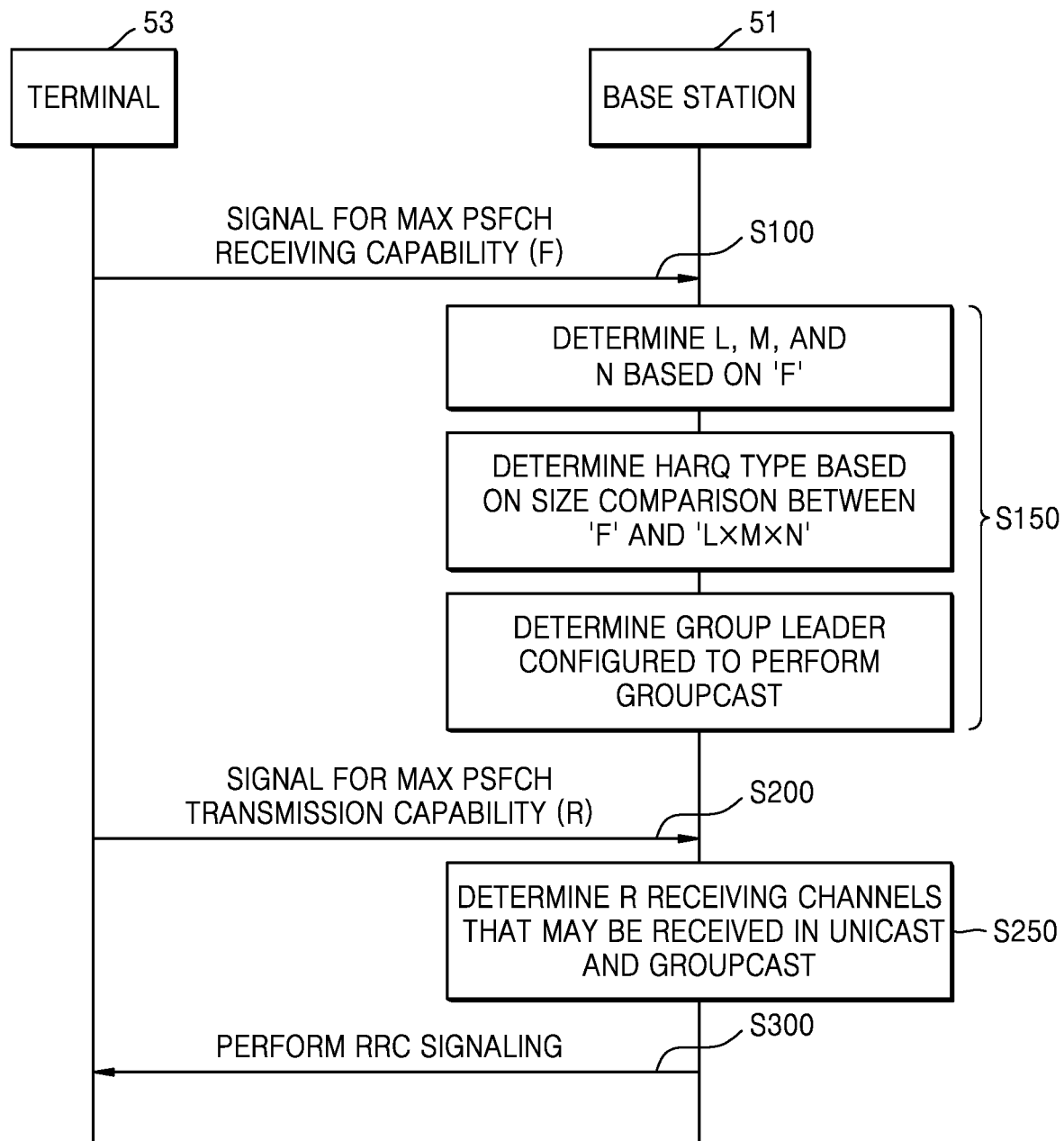
FIG. 8 is a flowchart of a process of transmitting signaling between a terminal and a base station, according to an embodiment.

FIG. 8 is a flowchart of a signaling process performed between the terminal 53 or 55 and the base station 51 of FIG. 2, according to an embodiment.

For reference, FIG. 8 will be described with reference to FIGS. 2 and 7.

Referring to FIG. 8, to enable efficient PSFCH transceiving operations in V2X communication, signaling may be mutually transmitted between a terminal 53, which may be for example a transmitting terminal, and a base station 51.

To begin with, at operation S100, to enable the efficient PSFCH transceiving operations, the terminal 53 may signal a maximum number of PSFCHs, which can be received during one TTI, to the base station 51. In embodiments, the maximum number of PSFCHs which may be received during one TTI may be referred to as a maximum PSFCH receiving capability F, or a max PSFCH receiving capability F.

Specifically, the processor 150 may control the transceiver 160 to signal the max PSFCH receiving capability F to the base station 51.

Here, the TTI may include a slot, and the max PSFCH receiving capability F may include the number of PSFCHs received in at least one of a groupcast and a unicast. That is, the max PSFCH receiving capability F may include a total number of PSFCH received in each of the groupcast and the unicast or include only the number of PSFCHs received in the groupcast or the unicast. Thus, the max PSFCH receiving capability F may be, for example, any one of 10, 20, 30, 40, 50, 100, 200, 300, and 410.

At operation S150, when the base station 51 receives signals for information about the max PSFCH receiving capability F from the terminal 53, the base station 51 may set sidelink communication of the terminal 53 to satisfy the following inequality: $F \geq L \times M \times N$.

For reference, F may refer to a maximum number of PSFCHs, which can be received during one slot, and L may refer to the number of PSSCHs transmitted in the groupcast during each slot. Also, M may refer to the number of receiving terminals included in the same group, for example a group of terminals for a groupcast, as the transmitting terminal, and N may refer to a PSFCH receiving period.

That is, to enable efficient PSFCH transceiving operations, the base station 51 may determine the values L, M, and N associated with the terminal 53 considering the maximum PSFCH receiving capability F. Also, the base station 51 may further consider the following methods in a groupcast mode to satisfy the inequality presented above.

1) When the inequality $F < L \times M \times N$ is satisfied in connection with the receiving terminals included in the group, the base station 51 may determine that 'NACK-based HARQ' in which only one common PSFCH is received from receiving terminals each corresponding to NACK, from among the receiving terminals included in the same group as the transmitting terminal, is an HARQ scheme. In this case, the value M may be 1.

2) When the inequality $F \geq L \times M \times N$ is satisfied in connection with the receiving terminals included in the group, the base station 51 may determine 'ACK/NACK-based HARQ' in which the transmitting terminal receives a PSFCH from each of all the receiving terminals included in the same group as the transmitting terminal, as an HARQ scheme.

3) To satisfy the inequality $F \geq L \times M \times N$, the base station 51 may determine a size of a zone, which is a range of an area set by the base station 51 to enable a groupcast. For example, when the terminals included in the group has a high value F, the base station 51 may set the zone to a larger size; whereas when the terminals included in the group has a low value F, the base station 51 may set the zone to a smaller size. For reference, the number of terminals included in the group may be determined based on the size of the zone.

4) When a group leader configured to perform a groupcast is determined among the terminals included in the group, the base station 51 may select a terminal having a value F, which satisfies the inequality $F \geq L \times M \times N$, as the group leader. When a plurality of terminals satisfy the above condition, the base station 51 may select a terminal having the best channel state as the group leader.

Moreover, at operation S200, to enable efficient PSFCH transceiving operations, the terminal 53 may signal a maximum number of PSFCHs, which can be transmitted during one TTI, to the base station 51. In embodiments, the maximum number of PSFCHs which may be transmitted during one TTI may be referred to as a maximum PSFCH transmission capability R, or a max PSFCH transmission capability R.

Specifically, the processor 150 may control the transceiver 160 to signal the max PSFCH transmission capability R to the base station 51.

Here, the TTI may include a slot, and the max PSFCH transmission capability R may include the number of PSFCHs transmitted in at least one of a groupcast and a unicast. That is, the max PSFCH transmission capability R may include a total number of PSFCHs transmitted in each of the groupcast and the unicast or include only the number of PSFCH transmitted in the groupcast or the unicast. Thus, the max PSFCH transmission capability R may be, for example, any one of, 1, 2, 3, 4, 5, 10, 20, 30, and 68.

For reference, operation S200 may be performed before operation S100 or operations S100 and S200 may be performed simultaneously. Also, the terminal 53 may perform only one of operations S100 and S200, and the base station 51 may perform only a specific operation S150 or S250, or only a portion of operations S150 or S250, according to the operation performed by the terminal 53. However, for brevity, an example embodiment pertains an example in which operation S200 is performed after operation S100 and the terminal 53 performs both operations S100 and S200.

When the base station 51 receives signaling information about the max PSFCH transmission capability R from the terminal 53, at operation S250 the base station 51 may set the sidelink communication of the terminal 53 to satisfy the following inequality: $U+G \geq R$ For reference, U may refer to the number of PSSCHs received in the unicast during one slot, and G may refer to the number of PSSCHs received in the groupcast during one slot. Also, R may refer to a maximum number of PSFCHs, which can be transmitted during one slot.

That is, to enable efficient PSFCH transceiving operations, the base station 51 may determine a unicast and/or a groupcast to which the terminal 53 may belong, by considering the max PSFCH transmission capability R based on the inequality $U+G \geq R$. Also, to satisfy the inequality above, the base station 51 may prioritize the unicast and the groupcast and determine R receiving channels, for example R receiving channels that may be received in the unicast and the groupcast, as receiving channels of the terminal 53 according to the order of higher priority.

As described above, due to the above-described processes, at operation S300 the base station 51 may perform RRC signaling to the terminal 53 based on the signaling received from the terminal 53. Thus, the base station 51 may perform a scheduling operation for sidelink communication of the terminal 53 or perform groupcast-related setting operations of, for example, selecting a leader in a group and setting a size of a zone for a groupcast.

As described above, signaling may be mutually transmitted between the terminal 53 and the base station 51 to enable efficient PSFCH transceiving operations in the V2X communication. Hereinafter, a PSFCH determination method of a terminal in V2X communication, according to an example embodiment, examples of which will be described with reference to FIGS. 9 and 10.

Figure 9:
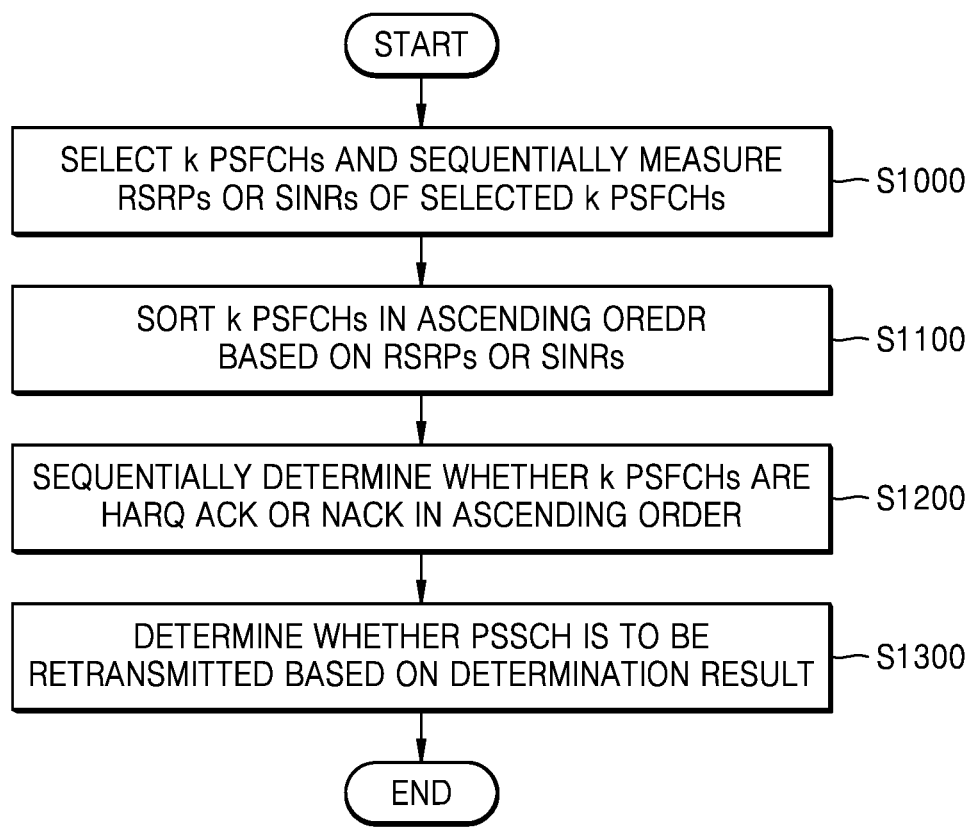
FIG. 9 is a flowchart of a PSFCH determination method of a terminal, according to an embodiment.
Figure 10:
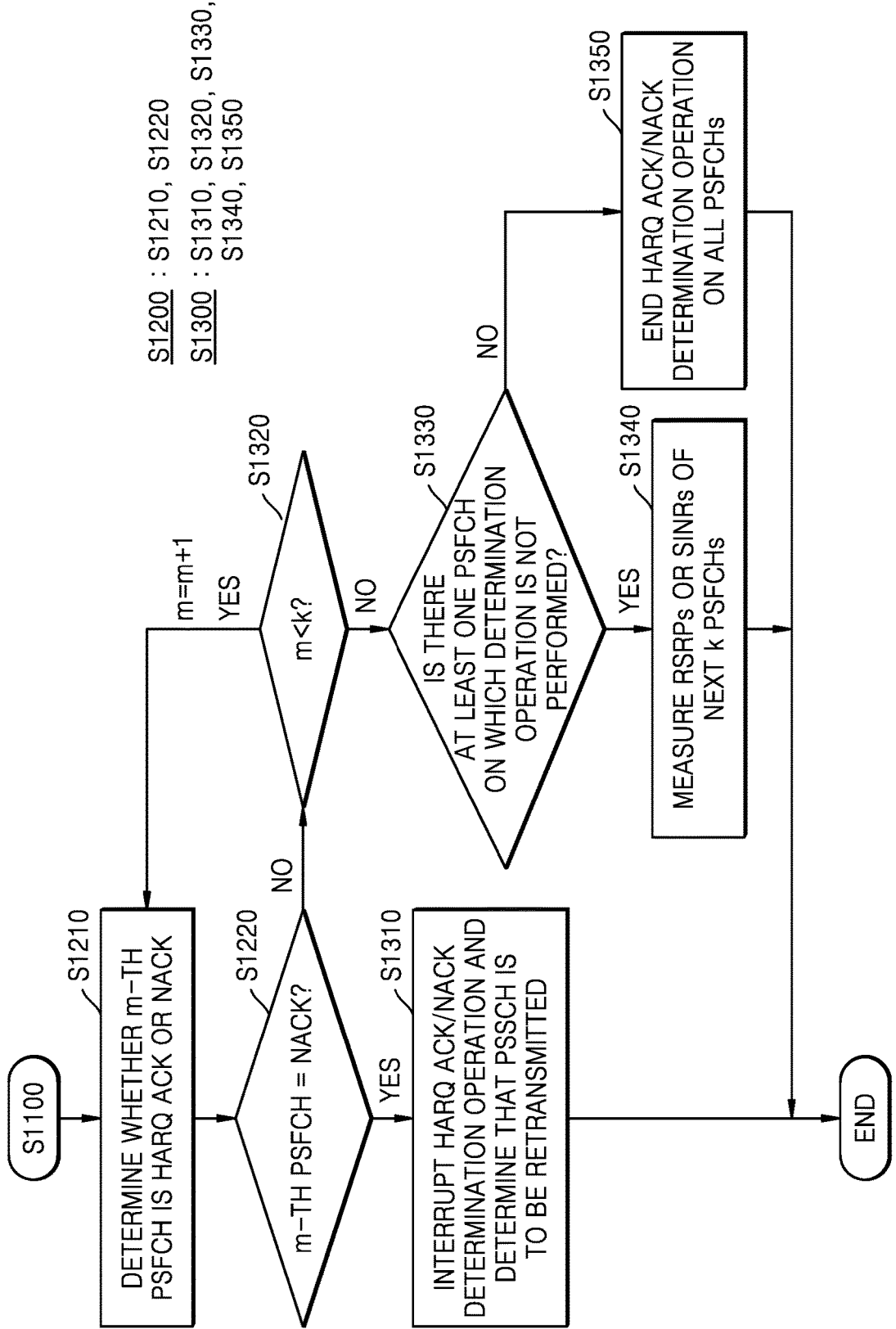
FIG. 10 is a detailed flowchart of operations S1200 and S1300 of FIG. 9, according to an embodiment.

FIG. 9 is a flowchart of a PSFCH determination method of a terminal, according to an example embodiment. FIG. 10 is a detailed flowchart of operations S1200 and S1300 of FIG. 9, according to an example embodiment.

For reference, FIGS. 9 and 10 will be described with reference to FIGS. 2 and 7.

Referring to FIG. 9, to begin with, at operation S1000 k PSFCHs (where k is an integer greater than 1) may be selected from all PSFCHs received during one TTI, and RSRPs or SINRs of the selected k PSFCHs may be measured.

Specifically, the processor 150 may select the k PSFCHs from all the PSFCHs, based on a preset specific criterion or randomly. Also, the processor 150 may control the transceiver 160 to sequentially measure RSRPs or SINRs of the k PSFCHs (where k is an integer greater than 1), from among all the PSFCHs received during one TTI.

For reference, the processor 150 may control the transceiver 160 to sequentially measure the RSRPs or SINRs of the k PSFCHs after all the k PSFCHs are selected. In embodiments, whenever one PSFCH is selected, the processor 150 may control the transceiver 160 to immediately measure an RSRP or SINR of the selected PSFCH.

Here, k may be preset by a manufacturer or a user of the terminal 53 based on at least one of a channel state of the terminal 53, performance of the terminal 53, and a total number of PSFCHs. Also, for example, when a base station, for example base station 51 in FIG. 8, sets a sidelink, the terminal 53 may be guided to set k as any one of values within a specific range.

When the RSRPs or SINRs of the selected k PSFCHs are sequentially measured, at operation S1100 the k PSFCHs may be sorted in ascending order based on the measured RSRPs or SINRs.

Specifically, the processor 150 may sort the k PSFCHs in the ascending order based on the RSRPs or SINRs of the k PSFCHs measured by the transceiver 160. When the sorting of the k PSFCHs in the ascending order is completed, at operation S1200 it may be sequentially determined whether the k PSFCHs, which are sorted, are HARQ ACK or NACK in ascending order, and at operation S1300 it may be determined whether a PSSCH is to be retransmitted based on the determination result.

Specifically, the processor 150 may control the transceiver 160 to sequentially determine whether the k PSFCHs, which are sorted, are HARQ ACK or NACK in the ascending order. Also, the processor 150 may determine whether the PSSCH is to be retransmitted based on the determination result.

For reference, the HARQ ACK/NACK determination operation may be performed by a channel decoder of the transceiver 160, for example the channel decoder included in the other components 130 of FIG. 6.

FIG. 10 specifically illustrates examples of operations S1200 and S1300, according to an embodiment.

Specifically, referring to FIG. 10, operation S1200 may start with operation S1210 of determining whether an m-th PSFCH (where $1 \leq m$ (integer)$\leq k$), from among the k PSFCHs that are sorted, is HARQ ACK or NACK.

Thus, if it is determined at operation S1220 that the m-th PSFCH (where $1 \leq m$ (integer)$\leq k$), from among the k PSFCHs that are sorted, is HARQ ACK, it may be determined at operation S1320 whether m is less than k. Based on a result of the determination of operation S1320, the HARQ ACK/NACK determination operation on m+1-th to k-th PSFCHs, from among the k PSFCHs that are sorted, may proceed (return to operation S1210) or the HARQ ACK/NACK determination operation on the k PSFCHs that are sorted may end (proceed to operations S1330 to S1350).

For example, when m is less than k, for example when there is at least one PSFCH on which the HARQ ACK/NACK determination operation is not performed, from among the k PSFCHs that are sorted, the HARQ ACK/

NACK determination operation may be sequentially performed on the m+1-th to k-th PSFCHs at operation S1210.

Otherwise, when m is equal to k, for example when the HARQ ACK/NACK determination operation on the k PSFCHs that are sorted is completely performed, the HARQ ACK/NACK determination operation on the k PSFCHs that are sorted may end, and it may be determined whether an operation of measuring RSRPs or SINRs of next k PSFCHs is to proceed, depending on whether there is at least one PSFCH on which the HARQ ACK/NACK determination operation is not performed, from among all the PSFCHs by proceeding to operations S1330 to S1350.

Specifically, at operation S1330, when there is at least one PSFCH on which the HARQ ACK/NACK determination operation is not performed, from among all the PSFCHs, the operation of measuring the RSRPs or the SINRs of the next k PSFCHs may proceed at operation S1340. In this case, operations S1100 to S1300 described above may be sequentially performed on the next k PSFCHs. Otherwise, at operation S1330, when there is no PSFCH on which the HARQ ACK/NACK determination operation is not performed, from among all the PSFCHs, the HARQ ACK/NACK determination operation on all the PSFCHs may end at operation S1350.

Moreover, at operation S1220 when it is determined that the m-th (where 1≤m (integer)≤k) PSFCH, from among the k PSFCHs that are sorted, is HARQ NACK, the HARQ ACK/NACK determination operation on the m+1-th to k-th PSFCHs, from among the k PSFCHs that are sorted, may be interrupted, and it is determined that the PSSCH is to be retransmitted at operation S1310.

For reference, if it is determined that the PSSCH is to be retransmitted, all PSSCHs, for example all PSSCHs corresponding to all the PSFCHs, may be retransmitted. Also, operations S1210 to S1350 described above may be performed by the processor 150 and the transceiver 160.

Specifically, in a PSFCH determination method of the terminal 53, according to an example embodiment, a completion of the measuring of the RSRPs or SINRs of the selected k PSFCHs (refer to operation S1000) may not be followed by selecting new k PSFCHs again from the remaining PSFCHs, but a subsequent processing operation, for example an ACK/NACK determination operation, on the selected k PSFCHs in operation S1000 may be performed before the new k PSFCHs are selected. Thus, the complexity of the ACK/NACK determination operation may be reduced as compared to a case in which it is determined whether all the PSFCHs are ACK or NACK at once, and a processing time and a memory required for the ACK/NACK determination operation may be reduced. In addition, NACK may be rapidly determined because a PSFCH having a low RSRP or SINR, from among the selected k PSFCHs, is first determined as ACK or NACK.

As described above, a PSFCH determination method of a terminal according to an example embodiment, may be performed. Hereinafter, an example of a PSFCH determination method of a terminal, according to another example embodiment, will be described with reference to FIGS. 11 and 12.

Figure 11:
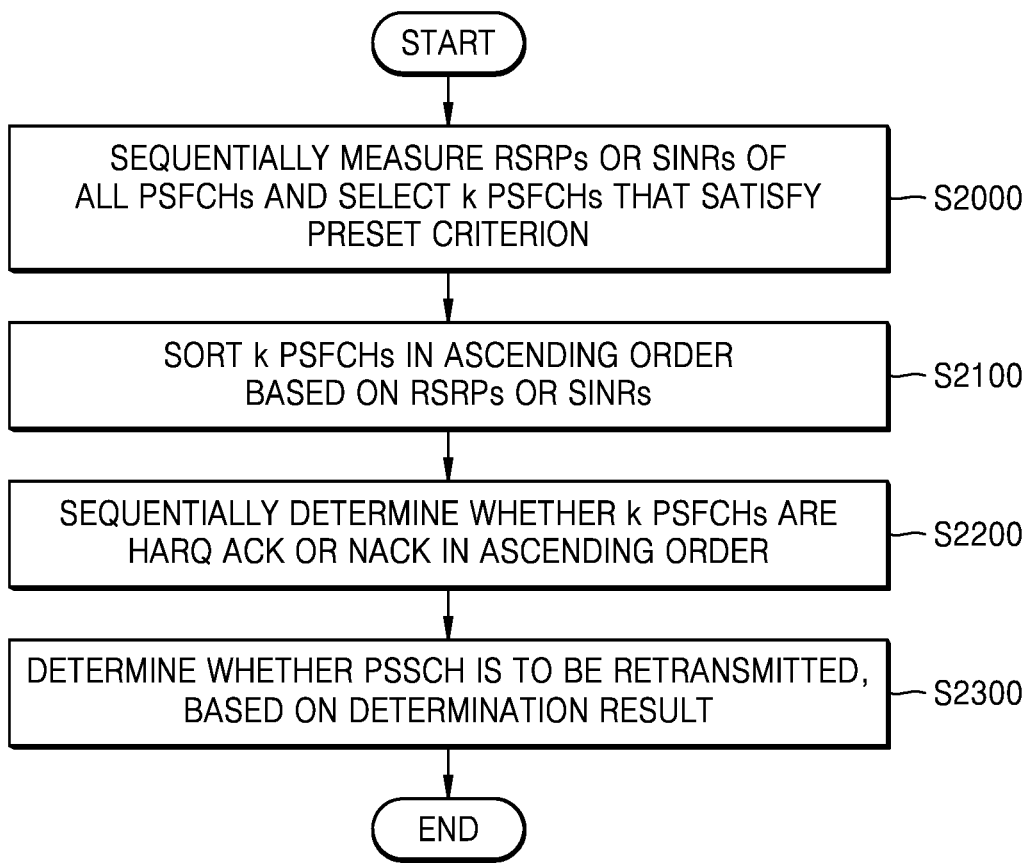
FIG. 11 is a flowchart of a PSFCH determination method of a terminal, according to an embodiment.
Figure 12:
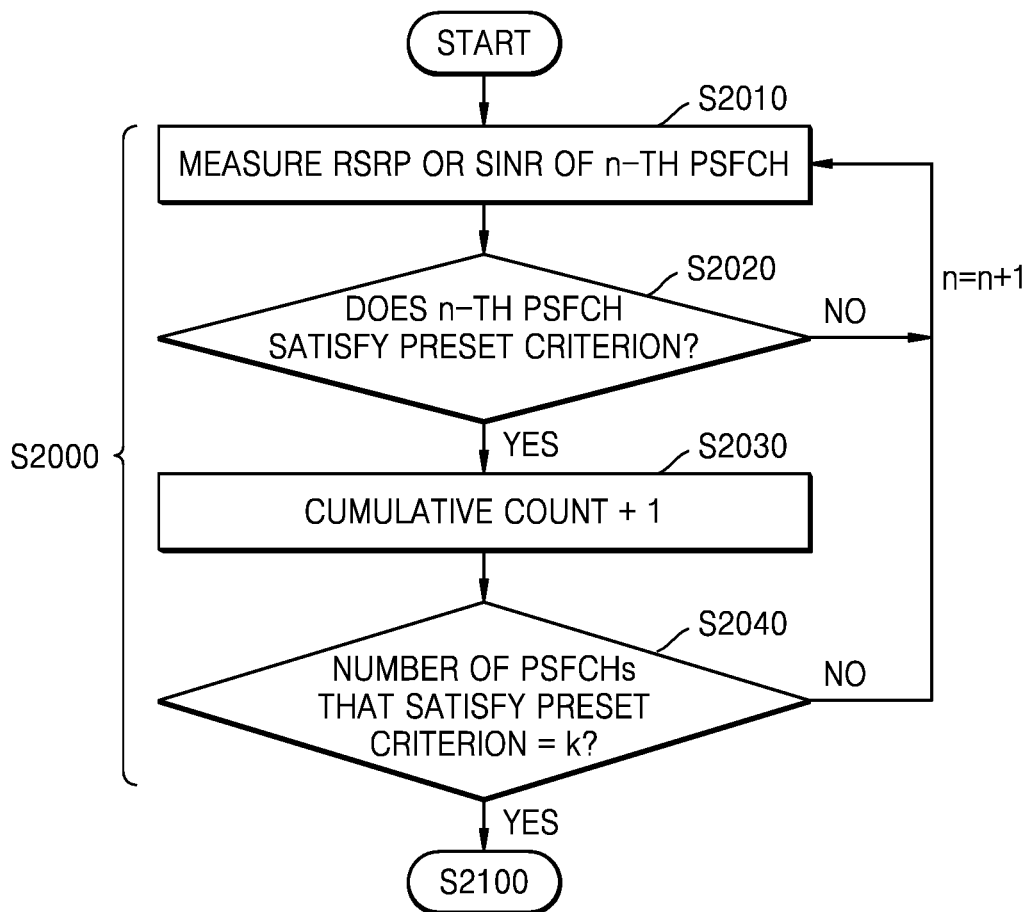
FIG. 12 is a detailed flowchart of operation S2000 of FIG. 11, according to an embodiment.

FIG. 11 is a flowchart of a PSFCH determination method of a terminal, according to an example embodiment. FIG. 12 is a detailed flowchart of operation S2000 of FIG. 11.

For reference, FIGS. 11 and 12 will be described with reference to FIGS. 2 and 7.

Referring to FIG. 11, to begin with, at operation S2000 RSRPs or SINRs of all PSFCHs, which are received during one TTI, may be measured, and k PSFCHs that satisfy the preset criterion may be selected from the PSFCHs of which the RSRPs or SINRs are measured. Here, k may be an integer greater than 1.

Specifically, the processor 150 may control the transceiver 160 to sequentially measure RSRPs or SINRs of all the PSFCHs received during one TTI. When the number of PSFCHs that satisfy the preset criterion, from among the PSFCHs of which the RSRPs or SINRs are measured, reaches k, the selecting operation, for example operation S2000, may end.

FIG. 12 specifically illustrates an example of operation S2000.

Specifically, referring to FIG. 12, operation S2000 may start with operation S2010 of measuring an RSRP or SINR of an n-th PSFCH (where n is a positive integer less than a total number of PSFCHs).

Thus, at operation S2010, when the RSRP or SINR of the n-th PSFCH (where n is a positive integer less than the total number of PSFCHs) is measured, it may be determined at operation S2020 whether the n-th PSFCH satisfies a preset criterion.

If it is determined that the n-th PSFCH satisfies the preset criterion, at operation S2030 a cumulative count of PSFCHs that satisfy the preset criterion may be incremented by 1. At operation S2040, when the cumulative count, which is incremented by 1, for example the number of PSFCHs that satisfy the preset criterion, is equal to k, operation S2100 of FIG. 11 may be performed. When the cumulative count, which is incremented by 1, for example the number of PSFCHs that satisfy the preset criterion, is less thank, operation S2010 of measuring an RSRP or SINR of the next PSFCH, for example an n+1-th PSFCH, may be performed.

Even when it is determined that the n-th PSFCH does not satisfy the preset criterion, operation S2010 of measuring the RSRP or SINR of the next PSFCH, for example the n+1-th PSFCH, may be performed.

For reference, various criteria may be present, and methods of selecting k PSFCHs based on each criterion may be as follows.

1) When k PSFCHs having an RSRP or SINR less than a preset reference value, from among all PSFCHs, are accumulated, a selecting operation may end. Specifically, an HARQ ACK/NACK determination operation may be performed on a PSFCH having an RSRP or SINR less than the preset reference value, while the HARQ ACK/NACK determination operation may not be performed on a PSFCH having an RSRP or SINR greater than or equal to the preset reference value. Results of a determination operation on some PSFCHs may be regarded as representing a determination operation on all the PSFCHs. According to the present method, a data rate may be improved by exploiting the fact that a PSFCH feedback is less likely to be NACK in the case of receiving terminals having a channel state better than a certain threshold.

2) When k PSFCHs having an RSRP or SINR greater than a preset reference value, from among all PSFCHs, are accumulated, a selecting operation may end. Specifically, an HARQ ACK/NACK determination operation may be performed on a PSFCH having an RSRP or SINR greater than the preset reference value, while the HARQ ACK/NACK determination operation may not be performed on a PSFCH having an RSRP or SINR less than or equal to the preset reference value. Results of a determination operation on some PSFCHs may be regarded as representing a determination operation on all the PSFCHs. According to the present method, a data rate may be improved by exploiting the fact that a PSFCH feedback is highly likely to be NACK in the case of receiving terminals having a channel state poorer than a certain threshold.

3) When k PSFCHs having an RSRP or SINR greater than a first reference value and less than a second reference value, from among all PSFCHs, are accumulated, a selecting operation may end. Here, the second reference value may be different from the first reference value. Specifically, an HARQ ACK/NACK determination operation may be performed only on a PSFCH having an RSRP or SINR greater than the first reference value and less than the second reference value. Results of a determination operation on some PSFCHs may be regarded as representing a determination operation on all the PSFCHs. According to the present method, a data rate may be improved by using both the two methods described above.

Herein, each of k and the reference value may be preset by a manufacturer or a user of the terminal 53 based on at least one of a channel state of the terminal 53, performance of the terminal 53, and a total number of PSFCHs. Also, for example, when a base station, for example base station 51 in FIG. 8, sets a sidelink, the terminal 53 may be guided to set k as any one of values within a specific range.

Referring back to FIG. 11, when the k PSFCH are selected at operation S2000, the selected k PSFCHs may be sorted in ascending order based on measured RSRPs or SINRs at operation S2100.

Specifically, the processor 150 may sort the k PSFCHs in the ascending order, based on the RSRPs or SINRs of the respective PSFCHs measured by the transceiver 160.

When the sorting of the k PSFCHs in the ascending order is completed, it may be sequentially determined whether the k PSFCHs, which are sorted, may be HARQ ACK or NACK in ascending order at operation S2200, and it may be determined whether a PSSCH is to be retransmitted based on the determination result at operation S2300.

For reference, because operations S2100 to S2300 may correspond to operations S1100 to S1300 described above with reference to FIGS. 9 and 10, detailed descriptions thereof are omitted.

As described above, the PSFCH determination method of the terminal, according to an example embodiment, may be performed. Hereinafter, a wireless communication device, which is implemented according to an embodiment, will be described with reference to FIG. 13.

Figure 13:
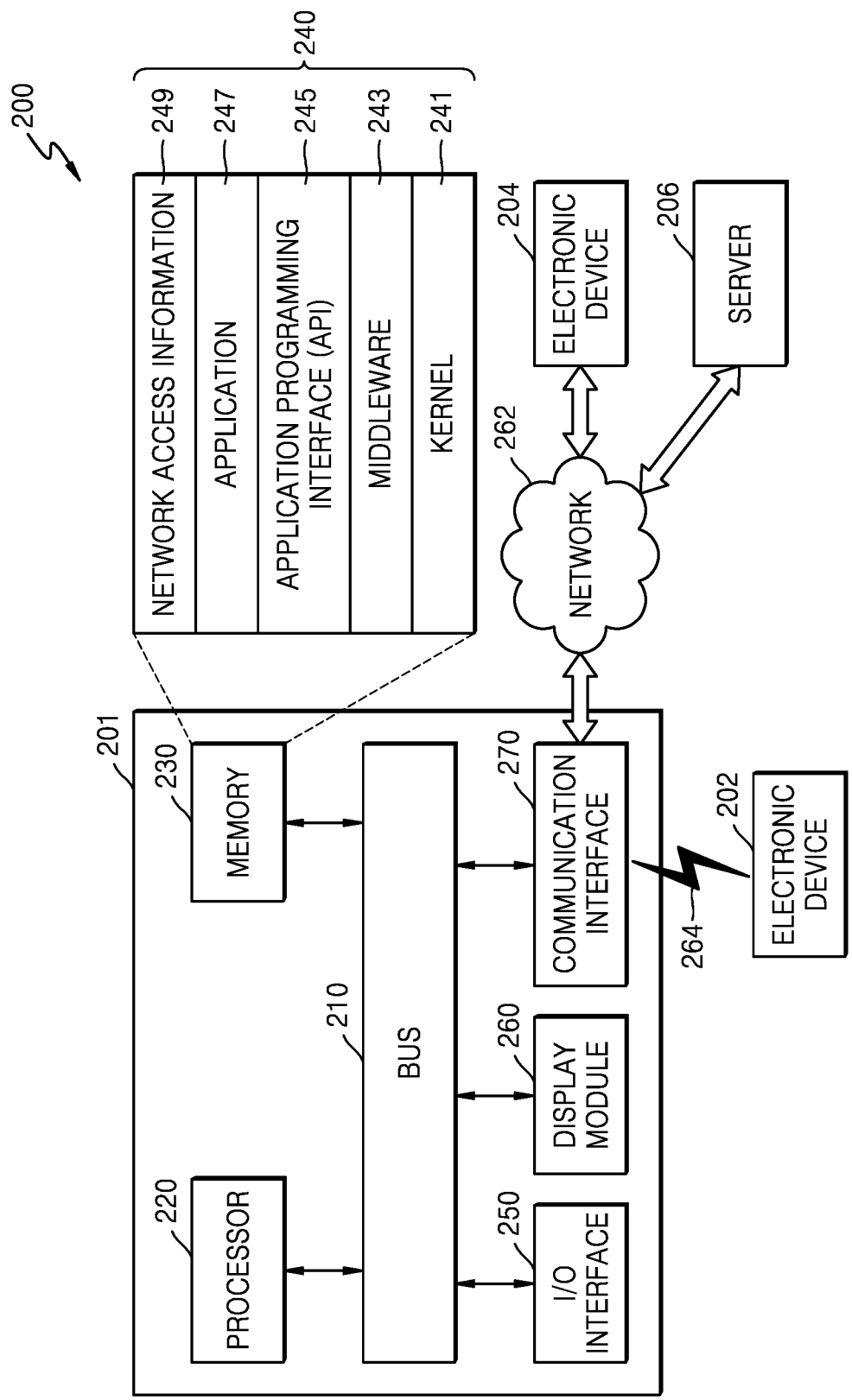
FIG. 13 is a diagram of a wireless communication device according to an embodiment.

FIG. 13 is a block diagram of a wireless communication device 201 according to an embodiment.

For reference, the wireless communication device 201 of FIG. 13 may be applied to a base station, for example base station 51 in FIG. 2; eNB, gNB, and AP, or a terminal, for example terminals 53 or 55 in FIG. 2; STA, MS, and UE, which is implemented according to embodiments. Furthermore, in some embodiments, the wireless communication device 201 of FIG. 13 may operate in a standalone (SA) mode or a non-standalone (NSA) mode.

Specifically, the wireless communication device 201 implemented in a network environment 200 is illustrated in FIG. 13.

The wireless communication device 201 may include a bus 210, a processor 220, a memory 230, an input/output (I/O) interface 250, a display module 260, and a communication interface 270. In another case, the wireless communication device 201 may omit at least one of the components described above or may further include at least one other component. However, for brevity, an example embodiment pertains an example in which the wireless communication device 201 includes the components described above.

The bus 210 may connect the processor 220, the memory 230, the I/O interface 250, the display module 260, and the communication interface 270 to each other. Thus, signals, for example control messages and/or data, may be exchanged and transmitted among the processor 220, the memory 230, the I/O interface 250, the display module 260, and the communication interface 270 through the bus 210.

The processor 220 may include at least one of a central processing unit (CPU), an application processor (AP), or a communication processor (CP). Also, the processor 220 may perform operations or data processing operations related to the control and/or communication of other components of the wireless communication device 201. In embodiments, the processor 220 may be a component including functions of the processor 150 of FIG. 7.

The memory 230 may include a volatile memory and/or a non-volatile memory. Also, the memory 230 may store commands or instructions or data, which are associated with other components in the wireless communication device 201.

In addition, the memory 230 may store software and/or a program 240. The program 240 may include, for example, a kernel 241, middleware 243, an application programming interface (API) 245, an application program 247 (also referred to as an "application"), and network access information 249.

For reference, at least some of the kernel 241, the middleware 243, and the API 245 may be called an operating system (OS). Also, in embodiments the memory 230 may be a component including functions of the memory 170 of FIG. 7.

For example, the I/O interface 250 may transmit commands or data, which are received from a user or another external device, to other components of the wireless communication device 201. Also, the I/O interface 250 may output commands or data, which are received from other components of the wireless communication device 201, to a user or another external device.

The display module 260 may include, for example, a liquid crystal display (LCD), a light-emitting diode (LED) display, an organic LED (OLED) display, a micro electromechanical systems (MEMS) display, or an electronic paper display.

In addition, the display module 260 may display various contents, for example texts, images, videos, icons, or symbols, to the user. The display module 260 may include a touch screen and receive a touch, a gesture, proximity, or a hovering input by using, for example, an electronic pen or a user's body part.

The communication interface 270 may set communication between the wireless communication device 201 and an external device, for example electronic devices 202 and 204 or a server 206. For example, the communication interface 270 may be connected to a network 262 through wireless communication or wired communication and communicate with an external device, for example the electronic device 204 or the server 206. Also, the communication interface 270 may communicate with an external device, for example the electronic device 202, through wireless communication 264. In addition, the communication interface 270 may be a component including functions of the transceiver 160 of FIG. 7.

For reference, the wireless communication 264 may be a cellular communication protocol and use, for example, at least one of NR, LTE, LTE-A, CDMA, WCDMA, a universal mobile telecommunication system (UMTS), wireless broadband (WiBro), or GSM. In addition, the wired communication may include, for example, at least one of a universal serial bus (USB), a high-definition multimedia interface (HDMI), recommended standard 232 (RS-232), or plain old telephone service (POTS).

Furthermore, the network 262, which is a telecommunications network may include, for example, at least one of a computer network, for example local area network (LAN) or wide-area network (WAN), the Internet, or a telephone network.

Moreover, each of the electronic devices 202 and 204, which are external devices, may be of the same type as or a different type from the wireless communication device 201. Also, the server 206 may include a group of at least one server.

For reference, all or some of operations performed by the wireless communication device 201 may be performed by other external devices, for example the electronic devices 202 and 204 or the server 206.

In addition, when the wireless communication device 201 needs to perform a function or a service automatically or by request, the wireless communication device 201 may perform the function or the service by itself or request other external devices, for example the electronic devices 202 and 204 or the server 206, to perform a partial function or service. Also, the other external devices, for example the electronic devices 202 and 204 or the server 206, may perform the requested function or service and transmit a result to the wireless communication device 201. In this case, the wireless communication device 201 may perform the function or the service based on the received result or by additionally processing the received result.

For the above-described mechanism, for example, a cloud computing technique, a distributed computing technique, or a client-server computing technique may be applied to the wireless communication device 201.

According to the embodiments described above, an excess of PSFCH receiving capability and an overload of an operation of determining whether PSFCHs are ACK or NACK may be solved by transmitting signaling for the max PSFCH transceiving capability and using an efficient ACK/NACK determination method of PSFCHs. Thus, the performance and operational efficiency of the terminal may be improved.

While embodiments been particularly shown and described, it will be understood that various changes in form and details may be made therein without departing from the spirit and scope of the following claims.

What is claimed is:

1. A terminal configured to perform vehicle-to-everything (V2X) communication, the terminal comprising:
a transceiver configured to transmit and receive one or more wireless signals; and
a processor configured to:
control the transceiver to measure reference signal received powers (RSRPs) or signal-to-interference & noise ratios (SINRs) of k physical sidelink feedback channels (PSFCHs), from among a plurality of PSFCHs received during one time transmission interval (TTI), wherein k is an integer greater than 1,
sort the k PSFCHs, based on the RSRPs or the SINRs, in ascending order,
control the transceiver to perform a sequential determination of whether the sorted k PSFCHs are a hybrid automatic repeat request (HARQ) acknowledgement (ACK) or a HARQ negative-acknowledgement (NACK) in the ascending order, and
determine whether a physical sidelink shared channel (PSSCH) is to be retransmitted, based on the sequential determination.

2. The terminal of claim 1, wherein, when the sequential determination indicates that an m-th PSFCH, from among the sorted k PSFCHs is the HARQ ACK, the processor is further configured to:
determine whether m is less than k; and
control the transceiver to continue the sequential determination on remaining PSFCHs from among the sorted k PSFCHs, or control the transceiver to end the sequential determination on the sorted k PSFCHs,
wherein m is an positive integer less than or equal to k.

3. The terminal of claim 2, wherein, when m is less than k, the processor is further configured to control the transceiver to continue the sequential determination on the remaining PSFCHs from among the sorted k PSFCHs.

4. The terminal of claim 2, wherein, when m is equal to k, the processor is further configured to control the transceiver to end the sequential determination, and determine whether to proceed with measuring of RSRPs or SINRs of additional PSFCHs based on whether there is at least one PSFCH on which the sequential determination is not performed, from among the plurality of PSFCHs.

5. The terminal of claim 4, wherein, when there is the at least one PSFCH on which the sequential determination is not performed, from among the plurality of PSFCHs, the processor is further configured to control the transceiver to proceed with the measuring of the RSRPs or the SINRs of the additional PSFCHs, and
when the sequential determination is performed on all of the plurality of PSFCHs, the processor is further configured to control the transceiver to end the sequential determination.

6. The terminal of claim 1, wherein, when it is determined that an m-th PSFCH, from among the sorted k PSFCHs is the HARQ NACK, the processor is further configured to:
control the transceiver to interrupt the sequential determination on remaining PSFCHs, from among the sorted k PSFCHs, and
retransmit the PSSCH,
wherein m is a positive integer less than or equal to k.

7. The terminal of claim 1, wherein k is set based on at least one of a channel state of the terminal, performance of the terminal, and a total number of the plurality of PSFCHs.

8. A terminal configured to perform vehicle-to-everything (V2X) communication, the terminal comprising:
a transceiver configured to transmit and receive one or more wireless signals; and
a processor configured to:
control the transceiver to measure reference signal received powers (RSRPs) or signal-to-interference & noise ratios (SINRs) of a plurality of physical sidelink feedback channels (PSFCHs) received during one time transmission interval (TTI),
select k PSFCHs that satisfy a preset criterion, from the plurality of PSFCHs, wherein k is an integer greater than 1,
sort the selected k PSFCHs based on the RSRPs or the SINRs, in ascending order,
control the transceiver to perform a sequential determination of whether the sorted k PSFCHs are a hybrid automatic repeat request (HARQ) acknowledgement (ACK) or a HARQ negative-acknowledgement (NACK) in the ascending order, and determine whether a physical sidelink shared channel (PSSCH) is to be retransmitted, based on the sequential determination.

9. The terminal of claim 8, wherein the preset criterion is satisfied when a RSRP or SINK is less than a preset reference value.

10. The terminal of claim 8, wherein the preset criterion is satisfied when a RSRP or SINR is greater than a preset reference values.

11. The terminal of claim 8, wherein the preset criterion is satisfied when a RSRP or SINR is greater than a first reference value and less than a second reference value,
wherein the second reference value is different from the first reference value.

12. The terminal of claim 8, wherein, when it is determined that an m-th PSFCH, from among the sorted k PSFCHs, is the HARQ ACK, the processor is further configured to:
determine whether m is less than k; and
control the transceiver to proceed with the sequential determination on remaining PSFCHs, from among the sorted k PSFCHs, or control the transceiver to end the sequential determination,
wherein m is a positive integer less than or equal to k.

13. The terminal of claim 12, wherein, when m is less than k, the processor is further configured to control the transceiver to proceed with the sequential determination on the remaining PSFCHs.

14. The terminal of claim 12, wherein, when m is equal to k, the processor is further configured to control the transceiver to end the sequential determination, and determine whether to proceed with selecting additional PSFCHs based on whether there is at least one PSFCH on which the sequential determination is not performed, from among the plurality of PSFCHs.

15. The terminal of claim 14, wherein, when there is the at least one PSFCH on which the sequential determination is not performed, from among the plurality of PSFCHs, the processor is further configured to select the additional PSFCHs, and
when the sequential determination is performed on all of the plurality of PSFCHs, the processor is further configured to control the transceiver to end the sequential determination.

16. The terminal of claim 8, wherein, when it is determined that an m-th PSFCH, from among the sorted k PSFCHs is the HARQ NACK, the processor is further configured to:
control the transceiver to interrupt the sequential determination on remaining PSFCHs, from among the sorted k PSFCHs; and
retransmit the PSSCH,
wherein m is a positive integer less than or equal to k.

* * * * *